(12) United States Patent
Okabe

(10) Patent No.: US 7,573,513 B2
(45) Date of Patent: Aug. 11, 2009

(54) IMAGE PROCESSING DEVICE AND IMAGE PROCESSING METHOD

(75) Inventor: Yoshimasa Okabe, Katano (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 10/508,776

(22) PCT Filed: Mar. 26, 2003

(86) PCT No.: PCT/JP03/03688

§ 371 (c)(1),
(2), (4) Date: Sep. 23, 2004

(87) PCT Pub. No.: WO03/081895

PCT Pub. Date: Oct. 2, 2003

(65) Prior Publication Data

US 2005/0140796 A1    Jun. 30, 2005

(30) Foreign Application Priority Data

Mar. 27, 2002    (JP) .............................. 2002-087854

(51) Int. Cl.
H04N 5/262    (2006.01)
(52) U.S. Cl. ................... 348/239; 348/231.99; 382/308
(58) Field of Classification Search ................ 348/239, 348/231.99; 382/308
See application file for complete search history.

(56) References Cited

U.S. PATENT DOCUMENTS

| | | | |
|---|---|---|---|
| 5,113,247 A | 5/1992 | Akiyama et al. | |
| 5,138,460 A * | 8/1992 | Egawa | ......................... 348/239 |
| 5,648,818 A | 7/1997 | Fukatsu | |
| 5,781,242 A | 7/1998 | Kondo et al. | |
| 6,266,446 B1 | 7/2001 | Rengakuji | |
| 6,335,728 B1 * | 1/2002 | Kida et al. | ................... 345/204 |
| 6,567,925 B1 * | 5/2003 | Kimura | ...................... 713/502 |
| 6,943,834 B1 * | 9/2005 | Hirai | ....................... 348/231.6 |

(Continued)

FOREIGN PATENT DOCUMENTS

DE    689 26 637    1/1997

(Continued)

OTHER PUBLICATIONS

Office Action issued Sep. 16, 2008 in corresponding European Application No. 03 712 970.7.

*Primary Examiner*—Brian Q Le
*Assistant Examiner*—Aklilu K Woldemariam
(74) *Attorney, Agent, or Firm*—Wenderoth, Lind & Ponack, L.L.P.

(57) ABSTRACT

An image processing apparatus having an arithmetic circuit for generating pixel data of output pixels by arithmetically processing the pixel data of M horizontally adjoining pixels and N vertically adjoining pixels. A first temporary storage section readably stores the pixel data of the pixels ranging from the Mth pixel to the last pixel in each horizontal pixel line of an image. A second temporary storage section readably stores the pixel data of the pixels ranging from the head pixel to the (M−1)th pixel in each horizontal pixel line of the image. A third temporary storage section delays the pixel data stored in the first temporary storage section, receives the pixel data from the second temporary storage section, and simultaneously outputs pixel data of the M horizontally adjoining pixels and the N vertically adjoining pixels.

4 Claims, 38 Drawing Sheets

U.S. PATENT DOCUMENTS

| | | | |
|---|---|---|---|
| 6,961,084 B1 * | 11/2005 | Duncan et al. | 348/222.1 |
| 7,176,966 B2 * | 2/2007 | Inoue et al. | 348/222.1 |
| 2002/0140829 A1 * | 10/2002 | Colavin et al. | 348/231.99 |
| 2004/0135903 A1 * | 7/2004 | Brooks et al. | 348/231.99 |

FOREIGN PATENT DOCUMENTS

| | | |
|---|---|---|
| EP | 0 340 794 | 1/1990 |
| EP | 1 093 292 | 4/2001 |
| JP | 2-23790 | 1/1990 |
| JP | 6-125565 | 5/1994 |
| JP | 2001-257886 | 9/2001 |
| WO | 01/26363 | 4/2001 |
| WO | 01/87041 | 11/2001 |

* cited by examiner

Fig.5

| | | | | | | | | | | | | | | | | | | | |
|---|---|---|---|---|---|---|---|---|---|---|---|---|---|---|---|---|---|---|---|
| 1,1 | 2,1 | 3,1 | 4,1 | | 63,1 | 64,1 | 65,1 | 66,1 | 67,1 | 68,1 | 69,1 | | 128,1 | 129,1 | 130,1 |
| 1,2 | 2,2 | 3,2 | 4,2 | | 63,2 | 64,2 | 65,2 | 66,2 | 67,2 | 68,2 | 69,2 | | 128,2 | 129,2 | 130,2 |
| 1,3 | 2,3 | 3,3 | 4,3 | | 63,3 | 64,3 | 65,3 | 66,3 | 67,3 | 68,3 | 69,3 | | 128,3 | 129,3 | 130,3 |
| 1,4 | 2,4 | 3,4 | 4,4 | | 63,4 | 64,4 | 65,4 | 66,4 | 67,4 | 68,4 | 69,4 | | 128,4 | 129,4 | 130,4 |
| 1,63 | 2,63 | 3,63 | 4,63 | | 63,63 | 64,63 | 65,63 | 66,63 | 67,63 | 68,63 | 69,63 | | 128,63 | 129,63 | |
| 1,64 | 2,64 | 3,64 | 4,64 | | 63,64 | 64,64 | 65,64 | 66,64 | 67,64 | 68,64 | 69,64 | | 128,64 | 129,64 | 130,64 |
| 1,65 | 2,65 | 3,65 | 4,65 | | 63,65 | 64,65 | 65,65 | 66,65 | 67,65 | 68,65 | 69,65 | | 128,65 | 129,65 | 130,65 |
| 1,66 | 2,66 | 3,66 | 4,66 | | 63,66 | 64,66 | 65,66 | 66,66 | 67,66 | 68,66 | 69,66 | | 128,66 | 129,66 | 130,66 |

FIRST BLOCK — SECOND BLOCK 11, 12

14b : EVEN/ODD BIT
14c : EFFECTIVE BIT
14a : PIXEL DATA PORTION

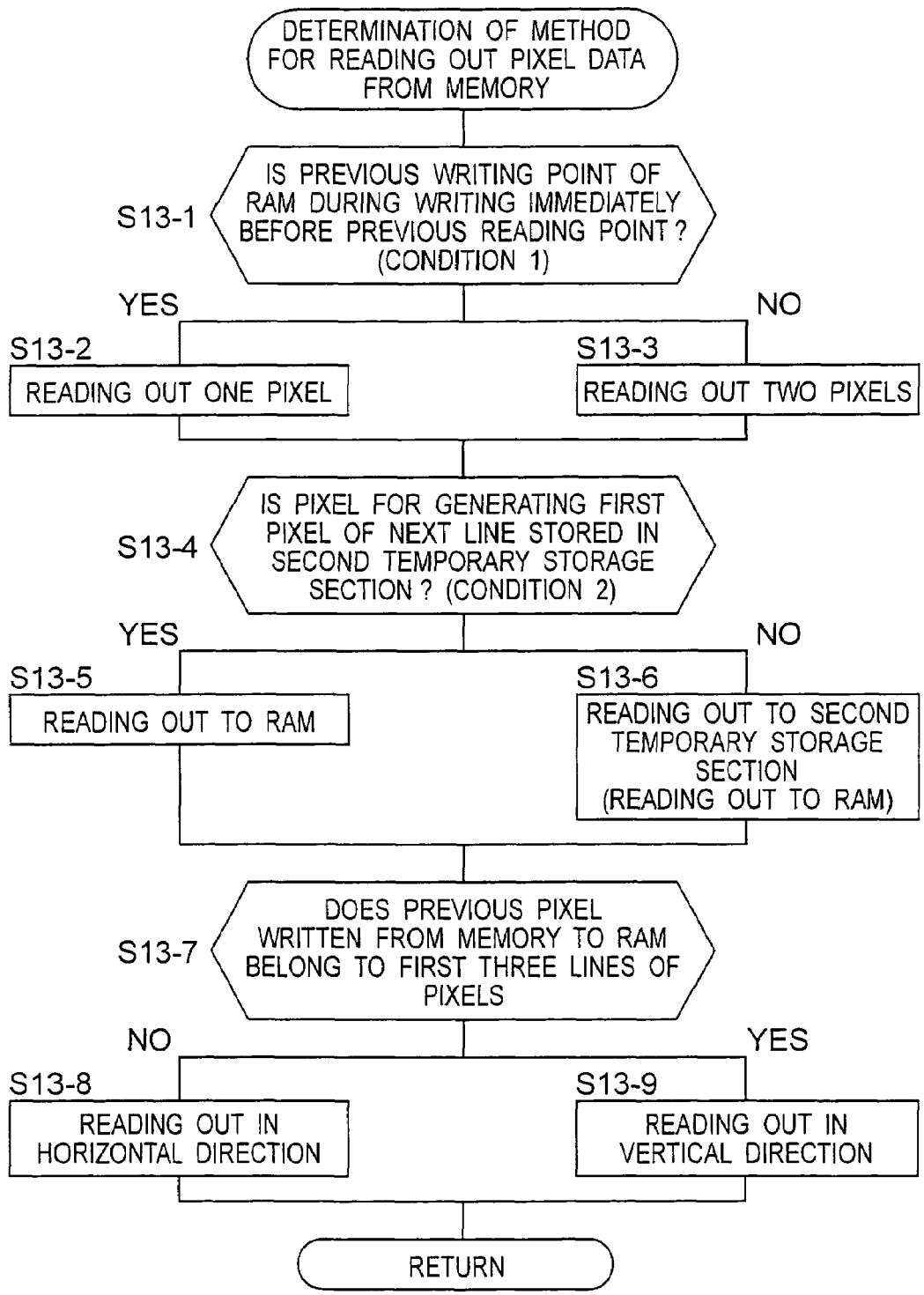

Fig. 14

| | CONDITION 1 | PREVIOUS WRITING POINT OF RAM UNDER WRITING IS IMMEDIATELY BEFORE PREVIOUS READING POINT. | | PREVIOUS WRITING POINT OF RAM UNDER WRITING IS NOT IMMEDIATELY BEFORE PREVIOUS READING POINT. | |
|---|---|---|---|---|---|
| | CONDITION 2 | PIXELS FOR GENERATING FIRST PIXEL OF NEXT LINE HAVE BEEN STORED IN SECOND TEMPORAY STORAGE CIRCUIT. | PIXELS FOR GENERATING FIRST PIXEL OF NEXT LINE HAVE NOT BEEN STORED IN SECOND TEMPORAY STORAGE CIRCUIT. | PIXELS FOR GENERATING FIRST PIXEL OF NEXT LINE HAVE BEEN STORED IN SECOND TEMPORAY STORAGE CIRCUIT. | PIXELS FOR GENERATING FIRST PIXEL OF NEXT LINE HAVE NOT BEEN STORED IN SECOND TEMPORAY STORAGE CIRCUIT. |
| CONDITION 3 | | | | | |
| PREVIOUS PIXEL WRITTEN TO RAM FROM MEMORY DOES NOT BELONG TO FIRST THREE LINES OF IMAGE BLOCK | | (LOADING METHOD A) LOAD ONE PIXEL IN HORIZONTAL DIRECTION FROM MEMORY TO RAM | (LOADING METHOD B) LOAD ONE PIXEL IN HORIZONTAL DIRECTION FROM MEMORY TO SECOND TEMPORARY STORAGE | (LOADING METHOD C) LOAD TWO PIXELS IN HORIZONTAL DIRECTION FROM MEMORY TO RAM | (LOADING METHOD D) LOAD ONE PIXEL IN HORIZONTAL DIRECTION TO SECOND TEMPORARY STORAGE FROM MEOMORY AND ONE PIXEL IN HORIZONTAL DIRECTION TO RAM FROM MEMORY |
| PREVIOUS PIXEL WRITTEN TO RAM FROM MEMORY BELONGS TO FIRST THREE LINES OF IMAGE BLOCK | | (LOADING METHOD E) LOAD ONE PIXEL IN VERTICAL DIRECTION FROM MEMORY TO RAM | (LOADING METHOD F) LOAD ONE PIXEL IN VERTICAL DIRECTION FROM MEMORY TO SECOND TEMPORARY STORAGE | (LOADING METHOD G) LOAD TWO PIXELS IN VERTICAL DIRECTION FROM MEMORY TO RAM | (LOADING METHOD H) LOAD ONE PIXEL IN VERTICAL DIRECTION TO SECOND TEMPORARY STORAGE FROM MEOMORY AND ONE PIXEL IN VERTICAL DIRECTION TO RAM FROM MEMORY |

Fig. 15

| ITEM | | t | t+1 | t+2 | t+3 | t+4 | ... |
|---|---|---|---|---|---|---|---|
| ITEM1 | LOADING METHOD FROM MEMORY TO RAM | A | A | A | A | B | ... |
| ITEM2 | WRITING DESTINATION OF PIXEL READ OUT FROM MEMORY (FIRST PIXEL) | RAM20c | RAM20c | RAM20c | RAM20c | REGISTER 22ae | ... |
| ITEM3 | PIXEL WRITTEN TO RAM FROM MEMORY (FIRST PIXEL) | (63, 66) | (64, 66) | (65, 66) | (66, 66) | (65, 1) | ... |
| ITEM4 | WRITING DESTINATION OF PIXEL READ OUT FROM MEMORY (SECOND PIXEL) | — | — | — | — | — | ... |
| ITEM5 | PIXEL WRITTEN TO RAM FROM MEMORY (SECOND PIXEL) | — | — | — | — | — | ... |
| ITEM6 | WRITING POINT | 61th | 62th | 63th | 64(0)th | 0th | ... |
| ITEM7 | READING POINT | 62th | 63th | 64th | 1th | 2th | ... |
| ITEM8 | SWITCHING STATUS OF SECOND TEMPORARY STORAGE | UP | UP | UP | DOWN | UP | ... |
| ITEM9 | OUTPUT PIXEL | (62, 63) | (63, 63) | (64, 63) | (1, 64) | (2, 64) | ... |

| ITEM | t+5 | ... | t+9 | t+10 | ... |
|---|---|---|---|---|---|
| ITEM1 | H | ... | H | G | ... |
| ITEM2 | REGISTER 22be | ... | REGISTER 22cd | RAM20c | ... |
| ITEM3 | (65, 2) | ... | (66, 3) | (68, 3) | ... |
| ITEM4 | RAM20a | ... | RAM20b | RAM20a | ... |
| ITEM5 | (67, 1) | ... | (68, 2) | (69, 1) | ... |
| ITEM6 | 1th | ... | 2th | 3th | ... |
| ITEM7 | 3th | ... | 7th | 8th | ... |
| ITEM8 | UP | ... | UP | UP | ... |
| ITEM9 | (3, 64) | ... | (7, 64) | (8, 64) | ... |

| ITEM | t+66 | t+67 | t+68 | t+69 | ... |
|---|---|---|---|---|---|
| ITEM1 | G | G | H | H | ... |
| ITEM2 | RAM20a | RAM20c | REGISTER 22ae | REGISTER 22ad | ... |
| ITEM3 | (106, 1) | (106, 3) | (65, 4) | (66, 4) | ... |
| ITEM4 | RAM20b | RAM20a | RAM20b | RAM20c | ... |
| ITEM5 | (106, 2) | (107, 1) | (107, 2) | (107, 3) | ... |
| ITEM6 | 40th | -23th | -23th | -23th | ... |
| ITEM7 | 64th | 1th | 2th | 3th | ... |
| ITEM8 | UP | DOWN | UP | UP | ... |
| ITEM9 | (64, 64) | (65, 1) | (66, 1) | (67, 1) | ... |

Fig. 16

| ITEM | | t+70 | ... | t+104 | t+105 | ... |
|---|---|---|---|---|---|---|
| ITEM1 | LOADING METHOD FROM MEMORY TO RAM | G | ... | G | C | ... |
| ITEM2 | WRITING DESTINATION OF PIXEL READ OUT FROM MEMORY (FIRST PIXEL) | RAM20a | ... | RAM20c | RAM20a | ... |
| ITEM3 | PIXEL WRITTEN TO RAM FROM MEMORY (FIRST PIXEL) | (108, 1) | ... | (130, 3) | (68, 4) | ... |
| ITEM4 | WRITING DESTINATION OF PIXEL READ OUT FROM MEMORY (SECOND PIXEL) | RAM20b | ... | RAM20a | RAM20a | ... |
| ITEM5 | PIXEL WRITTEN TO RAM FROM MEMORY (SECOND PIXEL) | (108, 2) | ... | (67, 4) | (69, 4) | ... |
| ITEM6 | WRITING POINT | -22th | ... | 1th | 3th | ... |
| ITEM7 | READING POINT | 4th | ... | 38th | 39th | ... |
| ITEM8 | SWITCHING STATUS OF SECOND TEMPORARY STORAGE | UP | ... | UP | UP | ... |
| ITEM9 | OUTPUT PIXEL | (68, 1) | ... | (102, 1) | (103, 1) | ... |

| ITEM | t+129 | t+130 | t+131 | t+132 | t+133 | t+134 | ... |
|---|---|---|---|---|---|---|---|
| ITEM1 | C | C | C | D | D | C | ... |
| ITEM2 | RAM20a | RAM20a | RAM20a | REGISTER 22be | REGISTER 22bd | RAM20a | ... |
| ITEM3 | (116, 4) | (118, 4) | (120, 4) | (65, 5) | (66, 5) | (124, 4) | ... |
| ITEM4 | RAM20a | RAM20a | RAM20a | RAM20a | RAM20a | RAM20a | ... |
| ITEM5 | (117, 4) | (119, 4) | (121, 4) | (122, 4) | (123, 4) | (125, 4) | ... |
| ITEM6 | 51th | 53th | -9th | -7th | -5th | -3th | ... |
| ITEM7 | 63th | 64th | 1th | 2th | 3th | 4th | ... |
| ITEM8 | UP | UP | DOWN | UP | UP | UP | ... |
| ITEM9 | (127, 1) | (128, 1) | (65, 2) | (66, 2) | (67, 2) | (68, 2) | ... |

| | t+142 | t+143 |
|---|---|---|
| | C | A |
| | RAM20b | RAM20b |
| | (76, 5) | (78, 5) |
| | RAM20b | — |
| | (77, 5) | — |
| | 11th | 12th |
| | 12th | 13th |
| | UP | UP |
| | (76, 2) | (77, 2) |

Fig. 17

| Y-COORDINATE OF PIXEL | X-COORDINATE OF PIXEL | | | | | | | | | | | ... | | | | | | | | | | | | | | | | | | | | ... |
|---|---|---|---|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | | 62 | 63 | 64 | 65 | 66 | 67 | 68 | 69 | 70 | 71 | 72 | 73 | 74 | 75 | 76 | 77 | 78 | 79 | 80 | |
| 1 | | | | | | | | | | | | | | | | 4 | 7 | 5 | 8 | 10 | 12 | 13 | 15 | 16 | 18 | 19 | 21 | 22 | 24 | 25 | 27 | |
| 2 | | | | | | | | | | | | | | | | 5 | 8 | 6 | 9 | 10 | 12 | 14 | 15 | 17 | 18 | 20 | 21 | 23 | 24 | 26 | 27 | |
| 3 | | | | | | | | | | | | | | | | 6 | 9 | 7 | 10 | 11 | 13 | 14 | 16 | 17 | 19 | 20 | 22 | 23 | 25 | 26 | 28 | |
| 4 | | | | | | | | | | | | | | | | 68 | 69 | 103 | 104 | 105 | 106 | 107 | 108 | 109 | 110 | 111 | | | | | | |
| 5 | | | | | | | | | | | | | | | | 132 | 133 | 137 | 138 | 139 | 140 | 141 | 142 | 143 | 144 | | | | | | | |
| 6 | | | | | | | | | | | | | | | | | | | | | | | | | | | | | | | | |
| 7 | | | | | | | | | | | | | | | | | | | | | | | | | | | | | | | | |
| 61 | | | | | | | | | | | | | | | | | | | | | | | | | | | | | | | | |
| 62 | | | | | | | | | | | | | | | | | | | | | 1 | 2 | 3 | | | | | | | | | |
| 63 | | | | | | | | | | | | | | | | | | | | | | | | | | | | | | | | |
| 64 | | | | | | | | | | | | | | | | | | | | | | | | | | | | | | | | |
| 65 | | | | | | | | | | | | | | | | | | | | | | | | | | | | | | | | |
| 66 | | | | | | | | | | | | | | | | | | | | | | | | | | | | | | | | |

12

| Y-COORDINATE OF PIXEL | X-COORDINATE OF PIXEL | | | | | | | | | | | | ... | | | | | | | | | | | | | | | | | | | ... |
|---|---|---|---|---|---|---|---|---|---|---|---|---|---|---|---|---|---|---|---|---|---|---|---|---|---|---|---|---|---|---|---|---|
| | 101 | 102 | 103 | 104 | 105 | 106 | 107 | 108 | 109 | | | | 115 | 116 | 117 | 118 | 119 | 120 | 121 | 122 | 123 | 124 | 125 | 126 | 127 | 128 | 129 | 130 | | | | |
| 1 | 58 | 60 | 61 | 63 | 64 | 66 | 67 | 70 | 71 | | | | 80 | 82 | 83 | 85 | 86 | 88 | 89 | 91 | 92 | 94 | 95 | 97 | 98 | 100 | 101 | 103 | | | | |
| 2 | 59 | 60 | 62 | 63 | 65 | 66 | 68 | 70 | 72 | | | | 81 | 82 | 84 | 85 | 87 | 88 | 90 | 91 | 93 | 94 | 96 | 97 | 99 | 100 | 102 | 103 | | | | |
| 3 | 59 | 61 | 62 | 64 | 65 | 67 | 69 | 71 | 72 | | | | 81 | 83 | 84 | 86 | 87 | 89 | 90 | 92 | 93 | 95 | 96 | 98 | 99 | 101 | 102 | 104 | | | | |
| 4 | 121 | 122 | 122 | 123 | 123 | 124 | 124 | 125 | 125 | | | | 128 | 129 | 129 | 130 | 130 | 131 | 131 | 132 | 132 | 133 | 133 | 134 | 134 | 135 | 135 | 136 | 136 | 137 | | |
| 5 | | | | | | | | | | | | | | | | | | | | | | | | | | | | | | | | |
| 6 | | | | | | | | | | | | | | | | | | | | | | | | | | | | | | | | |
| 7 | | | | | | | | | | | | | | | | | | | | | | | | | | | | | | | | |
| 61 | | | | | | | | | | | | | | | | | | | | | | | | | | | | | | | | |
| 62 | | | | | | | | | | | | | | | | | | | | | | | | | | | | | | | | |
| 63 | | | | | | | | | | | | | | | | | | | | | | | | | | | | | | | | |
| 64 | | | | | | | | | | | | | | | | | | | | | | | | | | | | | | | | |
| 65 | | | | | | | | | | | | | | | | | | | | | | | | | | | | | | | | |
| 66 | | | | | | | | | | | | | | | | | | | | | | | | | | | | | | | | |

IMAGE PROCESSING DEVICE AND IMAGE PROCESSING METHOD

BACKGROUND OF THE INVENTION

1. Field of the Invention

The present invention relates to an image processing apparatus and an image processing method. More particularly, the present invention relates to an image processing apparatus and an image processing method suited for portable apparatuses, such as digital cameras and digital video cameras.

2. Description of the Related Art

In imaging apparatuses, such as digital cameras and digital video cameras, raw data (RGB data) obtained by A/D converting output signals of an imaging device is initially stored in a memory. Then, the raw data stored in the memory is converted into YC data by an image processing circuit. The image processing circuit is provided with a temporary storage circuit for writing the raw data read from the memory and an arithmetic circuit for executing arithmetic processing using the raw data of plural pixels read from the temporary storage circuit. FIG. 38 shows an example of a sequence wherein the raw data read from the memory is written to the temporary storage circuit for conversion processing. Specifically, the raw data is read sequentially for every horizontal pixel row (line) in one image 300. The conversion process requires plural adjacent pixels in the horizontal direction and/or vertical direction. Therefore, the writing sequence shown in FIG. 38 requires a large-capacity line memory capable of storing the pixels included in one line of the image 300 as a temporary storage circuit, thereby the image processing circuit becomes large in size.

Japanese Laid-open Patent Application No. 2000-354193 discloses that the image 300 is divided into plural blocks (image blocks 301) as shown in FIG. 39 and that the raw data in every image block 301 is read from the memory and processed. When the reading method shown in FIG. 39 is adopted, the line memory should only have a storage capacity capable of storing the pixels included in one line of the image block 301. This reduction in the storage capacity of the line memory can reduce the size of the image processing circuit.

BRIEF SUMMARY OF THE INVENTION

However, one image 300 divided into image blocks 301 as shown in FIG. 39 increases the frequency of line updating. Further, one image 300 divided into image blocks 301 requires updating of the image blocks 301. For example, when it is assessed that the number of pixels in the vertical direction in the image 300 is 1,218 and that the total number of the image blocks 301 included in the image 300 is 476, the number of line updating times in the case of the processing shown in FIG. 38 is 1,217. However, the number of line updating times in the case of the processing shown in FIG. 39, obtained as the product of the number of line updating times (65) in one image block 301 and the total number (475) of the image blocks 301, reaches 30,875.

When the reading of raw data in each image block 301 is carried out merely in every line as shown in FIG. 39, unconvertible combinations are formed in the raw data read from the memory to the temporary storage circuit at line updating and image block updating. While the raw data stored in the temporary storage circuit forms an unconvertible combination, the arithmetic circuit can not generate effective output pixels, whereby data in the line memory and registers constituting the temporary storage circuit is merely shifted.

For example, when conversion processing is executed by using the pixel data of three pixels in the horizontal direction and three pixels in the vertical direction, conversion processing cannot be carried out until the pixels of at least the third pixel 302 from the head of a new line is written to the temporary storage circuit as shown in FIG. 40 at the line updating. Further, at the updating of the image block 301, conversion processing cannot be carried out until the pixels of at least the third pixel 302 from the head of the third line is written as shown in FIG. 41. In the case when the image 300 is divided into the image blocks 301 as described above, numerous lines and image blocks need to be updated. Therefore, time loss during the updating of the lines and image blocks is not negligible, thereby reducing processing speed and increasing power consumption.

Accordingly, an object of the present invention is to eliminate the processing loss at the updating of the lines and images, thereby improving processing speed and reducing power consumption.

A first aspect of the present invention provides an image processing apparatus including an image storage section adapted to store an image, an arithmetic section adapted to generate output pixels by arithmetically processing adjacent pixels consisting of M pixels adjoining in the horizontal direction and N pixels adjoining in the vertical direction of the image, the M being an integer of two or more, and the N being an integer of one or more, a first temporary storage (reading out) section adapted to readably store the pixels ranging from a Mth pixel to a last pixel in each of horizontal pixel lines of the image, a second temporary storage (reading out) section adapted to readably store the pixels ranging from a head pixel to a (M−1)th pixel in each of the horizontal pixel lines of the image, and a third temporary storage section adapted to delay outputs of the pixels stored in the first temporary storage section, to receive the pixels from the second temporary storage section, and to simultaneously output the adjacent pixels consisting of the M pixels adjoining in the horizontal direction and the N pixels adjoining in the vertical direction to the arithmetic section.

The image includes both one frame of image and an image block obtained by dividing one frame of image.

The image processing apparatus further includes a control section. Prior to the pixels for generating a last output pixel of one of the horizontal pixel lines being stored in the third temporary storage (reading out) section, the control section reads the pixels ranging from the head pixel to the (M−1)th pixel of the next horizontal pixel line from the image storage section to write them to the second temporary storage section. After the pixels for generating the last output pixel of the one of the horizontal pixel lines are output from the third temporary storage section to the arithmetic section, the control section reads the pixels ranging from the head pixel to the (M−1)th pixel of the next horizontal pixel line from the second temporary storage section to write them to the third temporary storage section.

At line updating (i.e., when, after the generation of the last output pixel in one horizontal pixel line, the first output pixel in the next horizontal pixel line is generated by the arithmetic section), it is necessary that the pixels ranging from the head pixel to the Mth pixel in the next horizontal pixel line have already been stored in the third temporary storage section. In the first embodiment of the present invention, the pixels ranging from the head pixel to the (M−1)th pixel in the next horizontal pixel line are stored in the second temporary storage section before line updating and transferred from the second temporary storage section to the third temporary storage section. Therefore, even at the line updating, the third temporary storage section can output a set of effective pixels required for generating the output pixel to be received by the arithmetic section. In other words, processing loss at the line updating can be eliminated.

Further, it is preferable that the N is an integer of two or more, and that with respect to the pixels from the first to the Nth horizontal pixel lines of the image, the control section repeats an operation of sequentially reading the N pixels arranged in the vertical direction from the image storage section and writing the pixels in the first temporary storage section or the second temporary storage section with shifting a reading position in the horizontal direction.

At image updating (i.e., when, after the generation of the last output pixel in the last horizontal pixel line of one image, the output pixel in the first horizontal pixel line of the next image is generated), it is necessary that the pixels from the first to the Nth horizontal pixel lines of the next image have been stored in the third temporary storage section. By reading the pixels ranging from the first to the Nth horizontal pixel lines of the image and writing the pixels in the second and third temporary storage sections as described above, the third temporary storage section can output a set of effective pixels required for generating the output pixel to the arithmetic section even at the image updating. In other words, processing loss at the image updating can be eliminated.

Furthermore, it is preferable that the arithmetic section generates the output pixel in every unit time the first temporary storage section has N RAMs, and the control section reads one pixel from the image storage section and writes the pixel to the RAM or the second temporary storage section within the unit time when a previous writing address of the RAM being written to is immediately before a previous reading address. It is also preferable that the arithmetic section reads plural pixels from the image storage section and writes the pixels to the RAM and/or the second temporary storage section within the unit when the previous writing address of the RAM under writing is an address two or more immediately before the previous reading address.

Such controlling of the writing address and the reading address of the RAMs achieves effective usage of the storage capacities of the RAMs without causing problems in image processing.

A second aspect of the present invention provides an image processing method of generating output pixels by arithmetically processing adjacent pixels consisting of M pixels adjoining in a horizontal direction and N pixels adjoining in a vertical direction in an image stored in an image storage section, M being an integer of two or more, and N being an integer of one or more. The method including reading the pixels from the image storage section with shifting a reading position in the horizontal direction and writing the pixels in a first temporary storage section, reading the pixel from the first temporary storage section and writing the pixel in a third temporary storage section, delaying output of the pixels by the third temporary storage section so as to output the pixels consisting of the M adjacent pixels in the horizontal direction and the N adjacent pixels in the vertical direction to an arithmetic section, generating the output pixel from the M×N pixels by the arithmetic section before the pixels for generating a last output pixel in one horizontal pixel line are stored in the third temporary storage section, reading pixels ranging from a head pixel to a (M−1)th pixel in the next horizontal pixel line from the image storage section and writing the pixels in a second temporary storage section, and, after the pixels for generating the last output pixel in the one horizontal pixel line are outputted from the third temporary storage section to the arithmetic section, reading the pixels ranging from the head pixel to the (M−1)th pixel in the next line from the second temporary storage section and writing the pixels in the third temporary storage section.

According to the present invention, the pixels ranging from the head pixel to the (M−1)th pixel in each horizontal pixel line are previously stored in the second temporary storage section and then read and stored in the third temporary storage section before the line updating, whereby processing loss at line updating can be eliminated, and processing speed can be improved and power consumption can be reduced. Further, the plural pixels from the first to the Nth horizontal pixel lines of the image are read in the vertical direction with shifting the reading position in the horizontal direction. Therefore, processing loss at the image updating can be eliminated, processing speed can be improved, and power consumption can be reduced. Furthermore, by changing the speed of writing pixels in the RAMs serving as the first storage section depending on the distance between the writing address and the reading address, the storage capacities of the RAMs can be used effectively without causing problems in image processing.

BRIEF DESCRIPTION OF DRAWINGS

Other objects and characteristics of the present invention will be clarified according to the following descriptions regarding preferred embodiments referring to the accompanying drawings.

FIG. 5 is a view showing the assignment of coordinates to pixels;

FIG. 13 is a flowchart of a subroutine at step S12-1 of FIG. 12;

FIG. 14 is a table showing conditions for determining a loading method for first and second temporary storage sections;

FIGS. 15 and 16 are tables for illustrating the operation of the YC processing circuit from time "t" to time t+143;

FIG. 17 is a view showing times when the pixel data of respective pixels is transferred from a memory to the RAMs;

FIG. 18 is a view showing times when the pixel data stored in the RAMs is transferred to a third storage section;

FIG. 19 is a view showing times when the pixel data of respective pixels is generated;

DETAILED DESCRIPTION OF THE INVENTION

Figure 1:
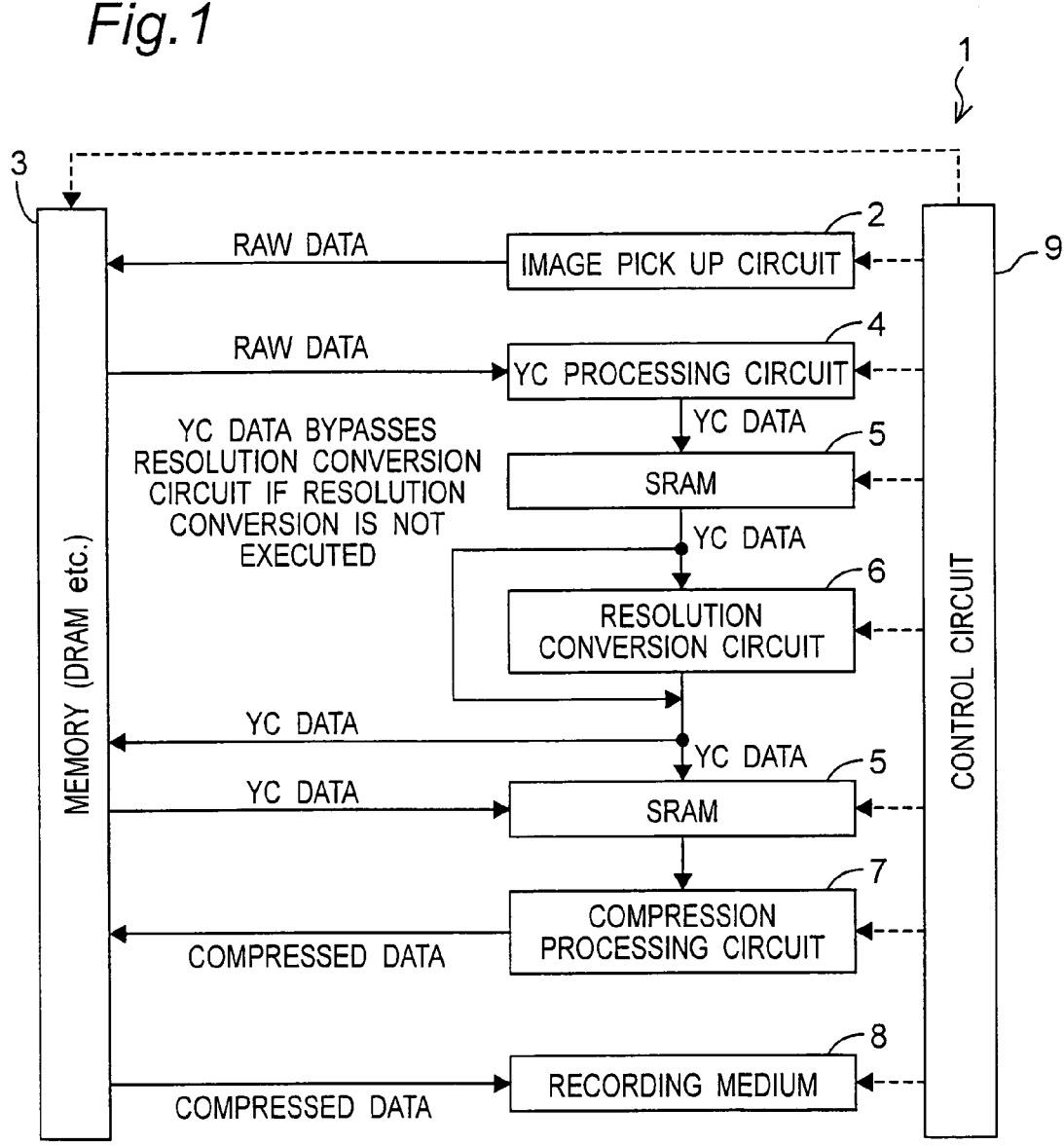
FIG. 1 is a block diagram showing a digital camera image processing system having a YC processing circuit according to an embodiment of the present invention.
Figure 3:
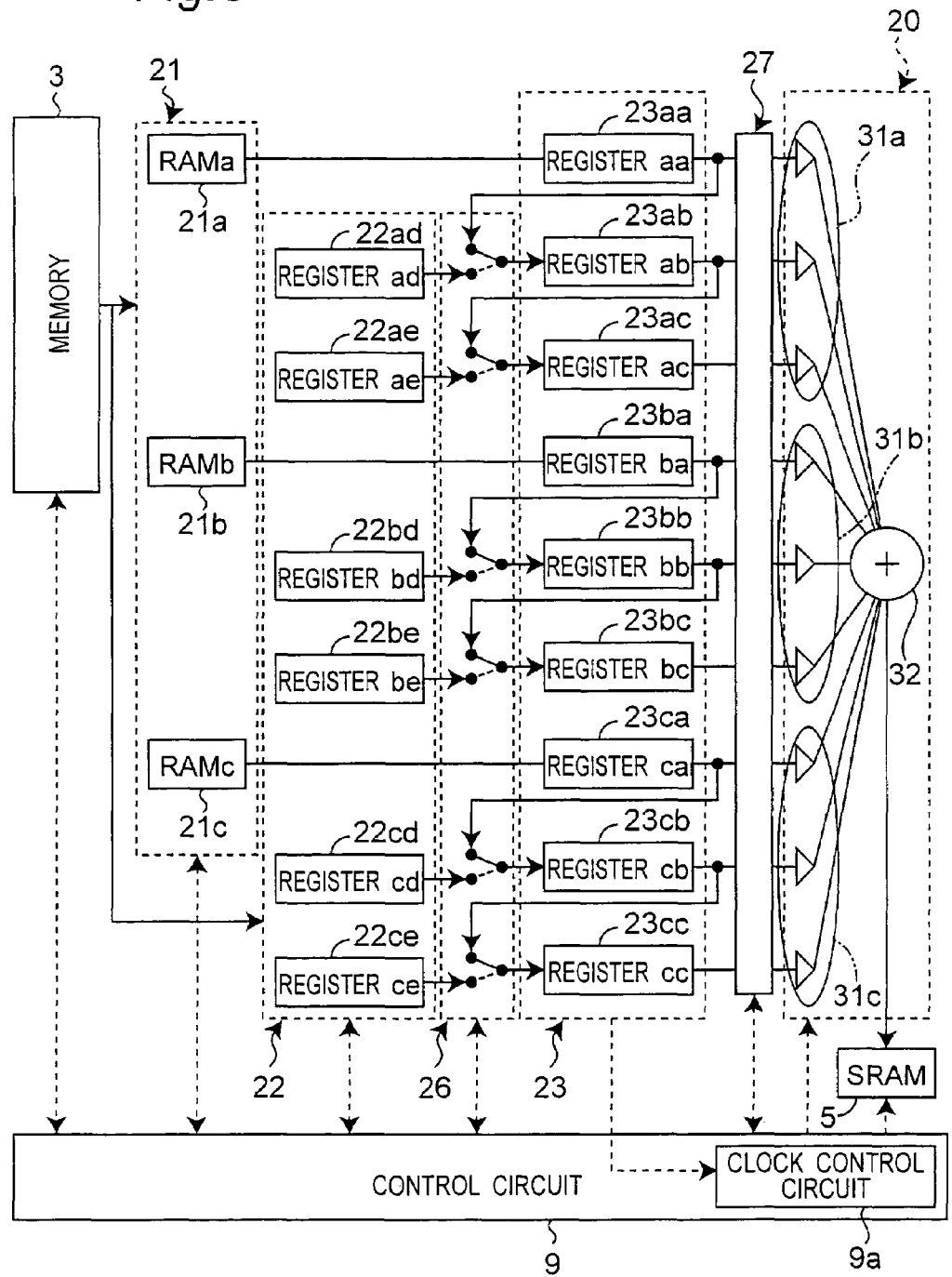
FIG. 3 is a circuit diagram showing the YC processing circuit.

FIG. 1 shows an image processing system 1 for a digital camera having an YC processing circuit 4 according to an embodiment of an image processing apparatus of the present invention, and FIG. 3 shows the details of the YC processing circuit 4. This image processing system 1 comprises an image pickup circuit 2 having a CCD or the like, a memory 3 formed of a DRAM or the like, the YC processing circuit 4, an SRAM 5, a resolution conversion circuit 6, a compression processing circuit 7 for executing compression processing, such as JPEG compression processing, a recording medium 8, such as an IC card, and a control circuit 9.

Figure 2:
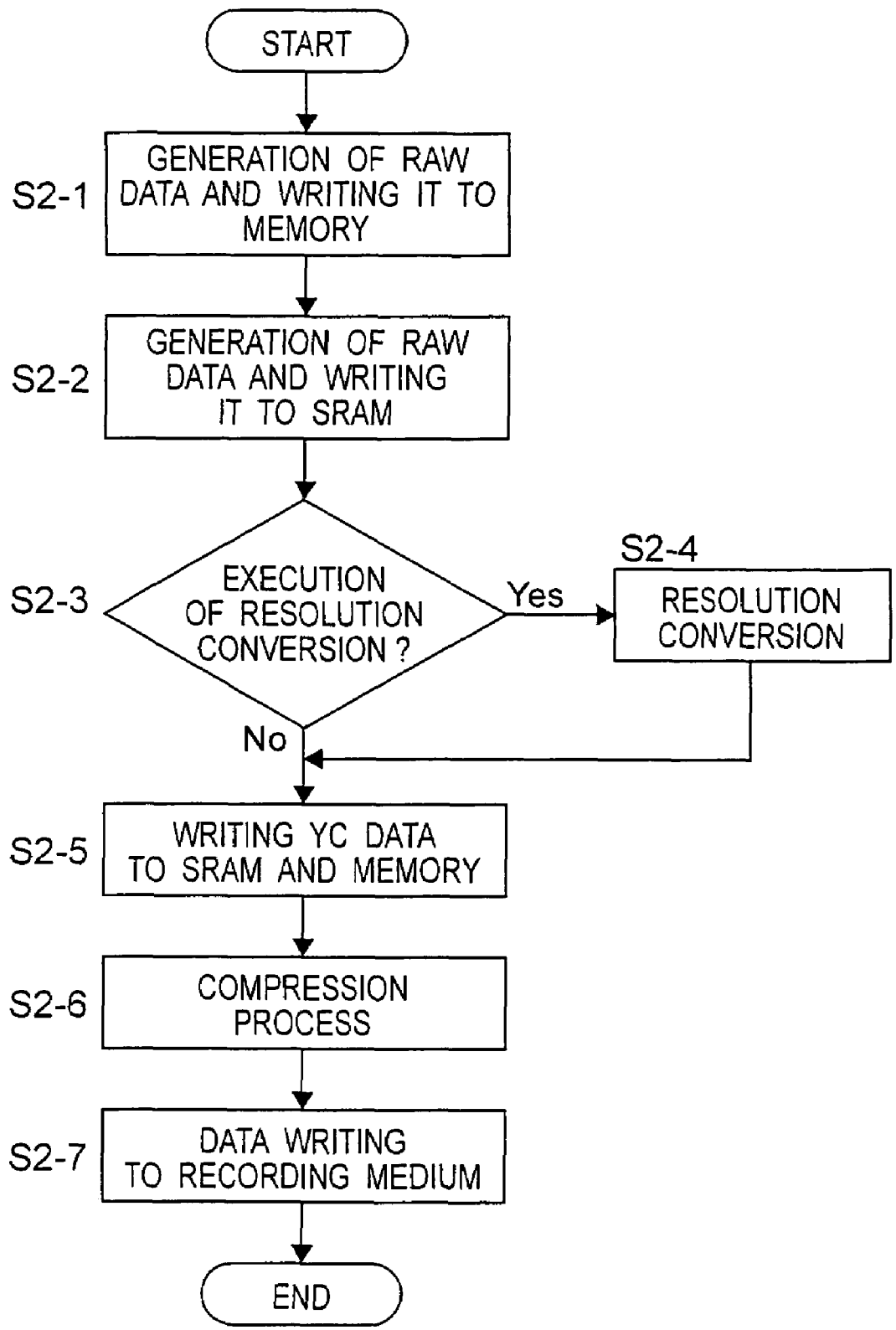
FIG. 2 is a flowchart illustrating the operation of the image processing system shown in FIG. 1.

The operation of this image processing system 1 will be described referring to FIG. 2. First, at step S2-1, raw data (RGB data) generated by the image pickup circuit 2 is written to the memory 3. Then, at step S2-2, the YC processing circuit 4 generates YC data on the basis of the raw data read from the memory 3, and the generated YC data is written to the SRAM 5. When it is judged at step S2-3 that resolution conversion is to be executed, the resolution conversion circuit 6 carries out resolution conversion for the YC data at step S2-4. At step S2-5, the YC data subjected to the resolution conversion is written to the SRAM 5 and the memory 3. When it is judged at step S2-3 that the resolution conversion is not executed, the YC data generated by the YC processing circuit 4 is written to the SRAM 5 and the memory 3 at step S2-5. At step S2-6, the compression processing circuit 7 compresses the YC data stored in the SRAM 5. The compressed data generated by the compression processing is written to the memory 3. At step S2-7, the compressed data in the memory 3 is written to the recording medium 8.

Figure 4:
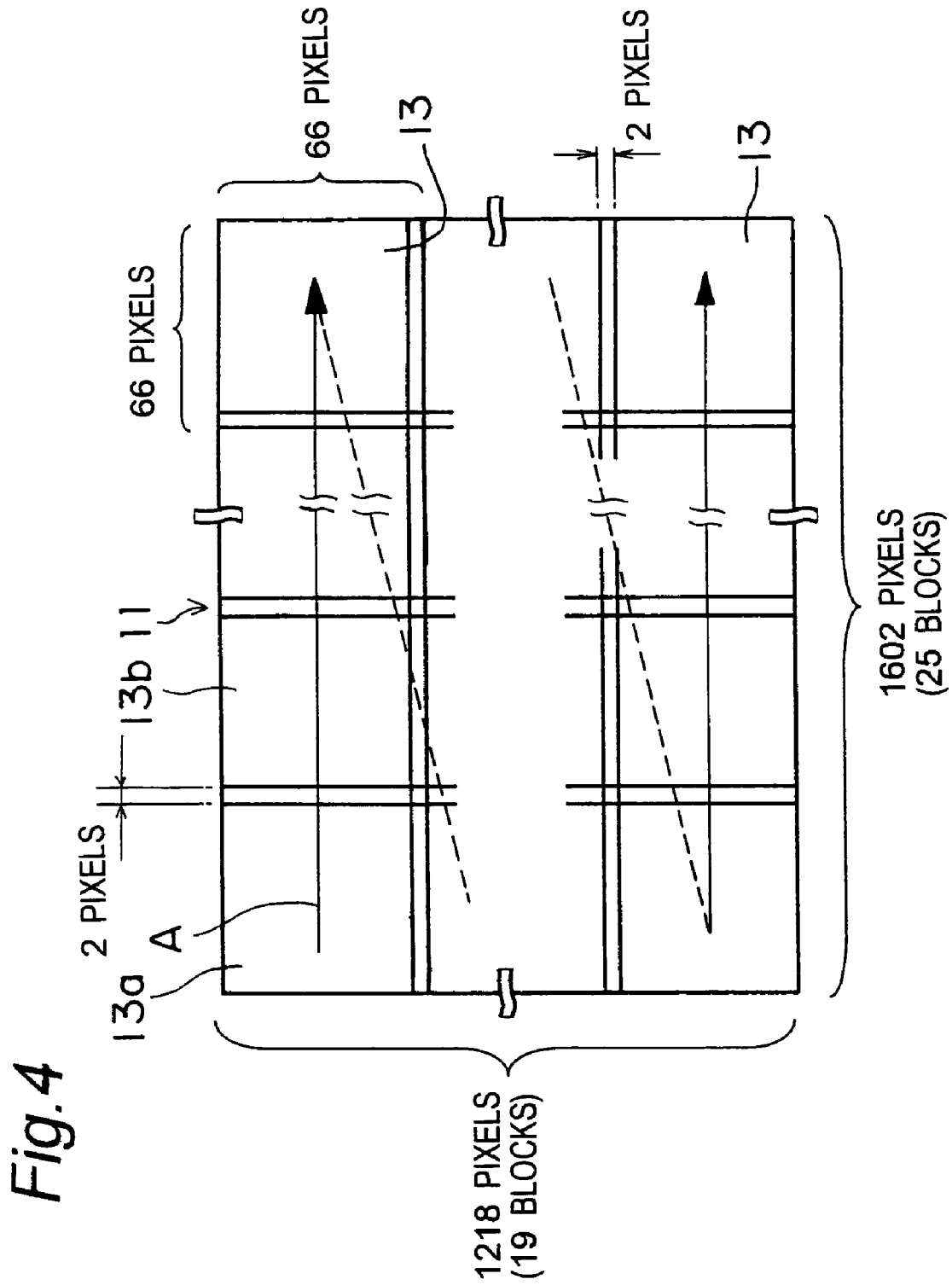
FIG. 4 is a view showing one frame of image.

In this embodiment, as shown in FIG. 4, with respect to the raw data stored in the memory 3, 1602 pixels in the horizontal direction and 1218 pixels in the vertical direction form one frame of image 11. In the following explanations, the position of each pixel 12 in the image 11 is represented by an X coordinate and a Y coordinate as shown in FIG. 5. For example, the pixel 12 represented by (67, 2) is a pixel at the 67th position from the left end and the second position from the upper end of the image 11. Furthermore, in the following explanations, a pixel arrangement or low in the horizontal direction is referred to as a line as necessary.

Further, as shown in FIGS. 4 and 5, the YC processing circuit 4 divides one frame of image 11 into image blocks 13 each formed of 66 pixels adjoining in the horizontal direction and 66 pixels adjoining in the vertical direction for processing. As described later, an arithmetic circuit 20 generates the YC data of an output pixel from the pixel data of nine pixels 12 formed of three pixels 12 adjoining in the horizontal direction and three pixels 12 adjoining in the vertical directions. Therefore, the pixel data of two pixels 12 in the horizontal direction, positioned at the boundary between two image blocks 13 adjoining in the horizontal direction, is used for the processing of both the image blocks 13. Similarly, the pixel data of two pixels 12 in the vertical direction, positioned at the boundary between two image blocks 13 adjoining in the vertical direction, is used for the processing of both the image blocks 13. One frame of image 11 includes 25 image blocks 13 in the horizontal direction and 19 image blocks 13 in the vertical direction, 475 image blocks 13 in total.

Figure 6:
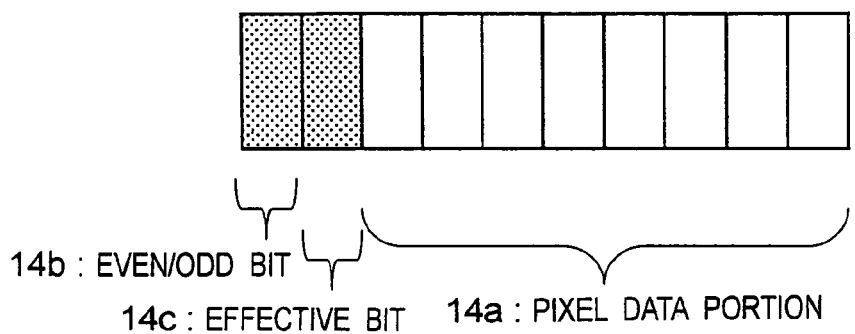
FIG. 6 is a schematic view showing the structure of pixel data.

As shown in FIG. 6, the raw data (hereafter referred to as pixel data) of each pixel 12 has an even/odd bit 14b and an effective bit 14c as the accompanying information of a pixel data portion 14a. The even/odd bit 14b indicates whether the pixel 12 belongs to an even-numbered line or an odd-numbered line. The effective bit 14c indicates whether or not the pixel data portion 14a of the pixel data of the pixel 12 is effective.

Referring to FIG. 3, the YC processing circuit 4 (portions identified by dotted lines) comprises the arithmetic circuit 20 for arithmetically processing the raw data of the pixels 12 stored in the memory 3, and also comprises a first temporary storage (reading out) section 21, a second temporary storage (reading out) section 22, a third temporary storage (reading out) section 23, a first selection section 26 and a second selection section 27 provided to output the pixel data of the pixels 12 stored in the memory 3 in arithmetically processable combinations.

Figure 8A:
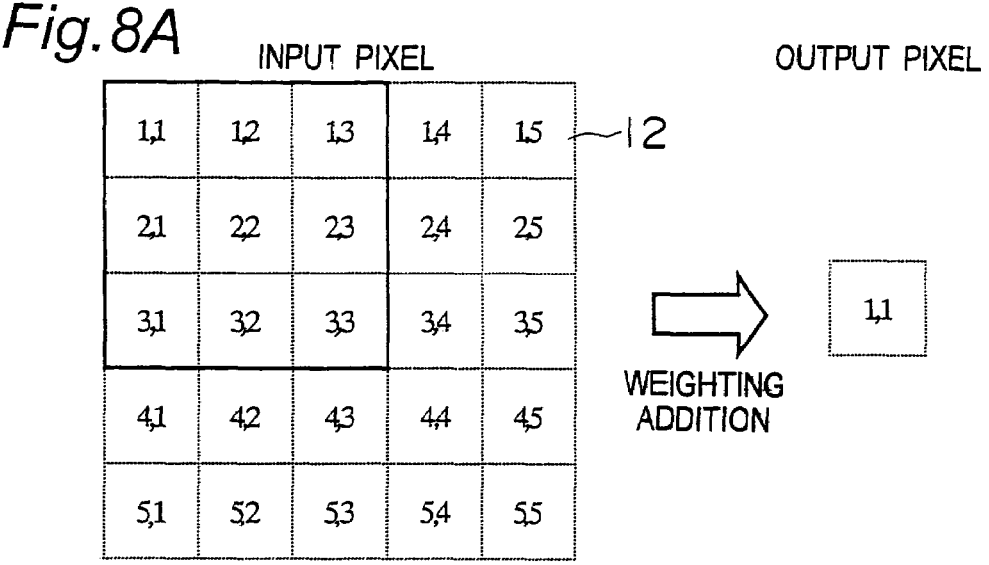
FIGS. 8A to 8C are views for illustrating a method of generating the output pixels.
Figure 8B:
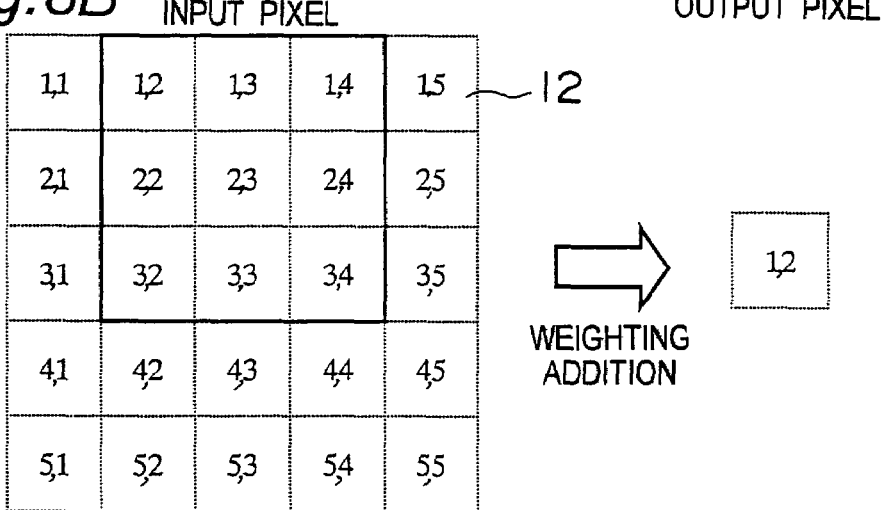
Figure 8C:
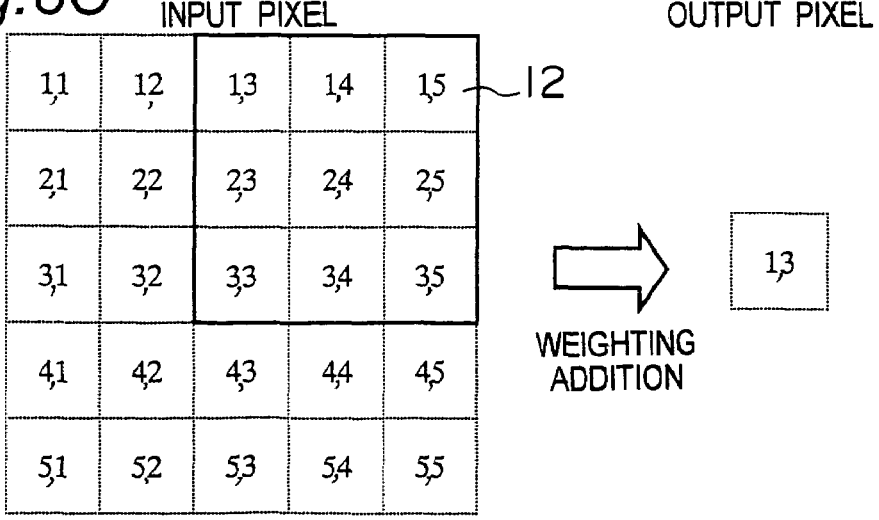

As shown in FIGS. 8A to 8C, the arithmetic circuit 20 executes weighing addition of the pixel data of nine pixels 12 formed of three pixels 12 adjoining in the horizontal direction and three pixels 12 adjoining in the vertical direction. For example, as shown in FIG. 8A, by weighing addition of the pixel data of nine pixels 12 from (1, 1) to (3, 3), the pixel data of the output pixel (1, 1) is obtained. For executing this weighing addition, the arithmetic circuit 20 has multipliers 31a, 31b and 31c, and an adder 32 for adding the outputs of these multipliers 31a to 31c. The arithmetic circuit 20 generates the pixel data of one output pixel in every unit time.

Figure 7:
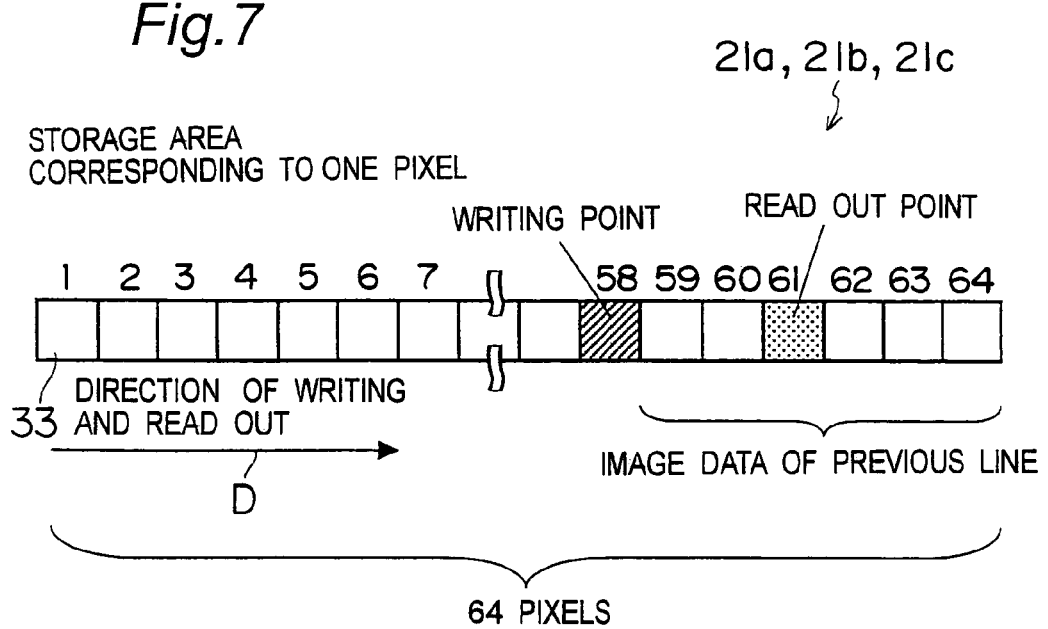
FIG. 7 is a schematic view showing a RAM.

The first temporary storage section 21 has three RAMs 21a, 21b, and 21c, each of which can store pixel data read from the memory 3. As described later in detail, the pixel data of the pixels 12 ranging from the third pixel from the head pixel to the last pixel (the 66th pixel) in each line in each image block 13 is stored in these three RAMs 21a, 21b, and 21c. As shown in FIG. 7, each of the RAMs 21a, 21b, and 21c has addresses 33, from No. 1 to No. 64. In each address 33, the pixel data of one pixel can be readably stored.

The second temporary storage section 22 has six registers 22ad, 22ae, 22bd, 22be, 22cd and 22ce, each of which can store the raw data of one pixel 12. As described later in detail, these six registers 22ad to 22ce are used to store the pixel data of the pixels 12 ranging from the head (first) pixel 12 to the second pixel 12 in each line in each image block 13. The registers 22ad and 22ae correspond to the RAM 21a of the first temporary storage section 21. Further, the registers 22bd and 22be correspond to the RAM 21b. Furthermore, the registers 22cd and 22ce correspond to the RAM 21c.

The third temporary storage section 23 has nine registers 23aa, 23ab, 23ac, 23ba, 23bb, 23bc, 23ca, 23cb, and 23cc, each of which can store the pixel data of one pixel 12. The registers 23aa to 23ac correspond to the RAM 21a of the first temporary storage section 21. Further, the registers 23ba to 23bc correspond to the RAM 21b. Furthermore, the registers 23ca to 23cc correspond to the RAM 21c.

The setting of the first selection section 26 can be changed between the upper position indicated by solid lines and the lower position indicated by dotted lines. When the setting of the first selection section 26 is at the upper position, every three of the registers 23aa to 23cc are connected in series. Specifically, the registers 23aa to 23ac, the registers 23ba to 23bc, and the registers 23ca to 23cc are respectively connected in series. Therefore, when the setting of the first selection section 26 is at the upper position, the registers 23aa to 23ac, the registers 23ba to 23bc, and the registers 23ca to 23cc of the third temporary storage section 23 respectively delay the output of pixel data from the RAMs 21a to 21c, and then output pixel data to the arithmetic circuit 20 via the second selection section 27.

When the setting of the first selection section 26 is at the lower position, the third temporary storage section 23 is connected to the second temporary storage section 22. Specifically, the registers 22ad and 22ae of the second temporary storage section 22 are respectively connected to the registers 23ab and 23ac of the third temporary storage section 23. Further, the registers 22bd and 22be of the second temporary storage section 22 are respectively connected to the registers 23bb and 23bc of the third temporary storage section 23. Furthermore, the registers 22cd and 22ce of the second temporary storage section 22 are respectively connected to the registers 23cb and 23cc of the third temporary storage section 23. Therefore, when the setting of the first selection section 26 is at the lower position, pixel data is respectively output from the registers 22ad and 22ae, the registers 22bd and 22be, and the registers 22cd and 22ce of the second temporary storage section 22 to the registers 23ab and 23ac, the registers 23bb and 23bc, and the registers 23cb and 23cc of the third temporary storage section 23.

The second selection section 27 has a function of changing the connection between the third temporary storage section 23 and the arithmetic circuit 20 so that the pixel data of the latest line is input to the multiplier 31a of the arithmetic circuit 20, the pixel data of the latest line but one is input to the multiplier 31b, and the pixel data of the latest line but two is input to the multiplier 31c.

The control circuit 9 controls the memory 3, the RAMs 21a to 21c, the registers 22ad to 22ce, the registers 23aa and 23cc, and the first selection section 26 and the second selection section 27 to transfer pixel data from the memory 3 to the first temporary storage section 21 and the second temporary storage section 22, to transfer pixel data from the first temporary storage section 21 and the second temporary storage section 22 to the third temporary storage section 23, and to transfer pixel data from the third temporary storage section 23 to the arithmetic circuit 20. In addition, the control circuit 9 controls the arithmetic circuit 20 to execute arithmetic processing and to transfer generated pixel data to the SRAM 5.

Further, pixel data is input to the clock control section 9a of the control circuit 9 via the third temporary storage section 23. On the basis of the even/odd bit 14b and the effective bit 14c, the clock control section 9a makes a judgment as to whether or not the arithmetic circuit 20 can generate effective output pixel data from the pixel data stored in the third temporary storage section 23. If the clock control section 9a judges that the arithmetic circuit 20 can not generate effective output pixel data from the pixel data stored in the third temporary storage section 23, the clock control section 9a stops the supply of its clock signal to the arithmetic circuit 20, thereby inhibiting the arithmetic processing of the arithmetic circuit 20. This prevents wasteful power consumption by the arithmetic circuit 20 when ineffective pixel data is input.

Then, the YC processing circuit 4 divides one frame of image 11 into 475 image blocks 13 in total, each formed of 66 pixels adjoining in the horizontal direction and 66 pixels adjoining in the vertical direction, and processes the image blocks 13. The sequence of processing the image blocks 13 is indicated by arrow "A" in FIG. 4. Specifically, the processing starts from the image block 13 located at the upper left corner of the image 11, and the image blocks 13 are processed sequentially, line by line.

The processing executed for each image block 13 by the YC processing circuit 4 can be broadly divided into three stages. At a first stage, the pixel data read from the memory 3 is written to the first temporary storage section 21 or the second temporary storage section 22. At a second stage, the pixel data read from the first temporary storage section 21 or the second temporary storage section 22 is written to the third temporary storage section 23. At a third stage, the arithmetic circuit 20 generates output pixel data on the basis of the pixel data read from the third temporary storage section 23. As described latter in detail, in accordance with this embodiment, at the second stage, time loss during line updating is eliminated by providing the second temporary storage section 22.

Figure 9:
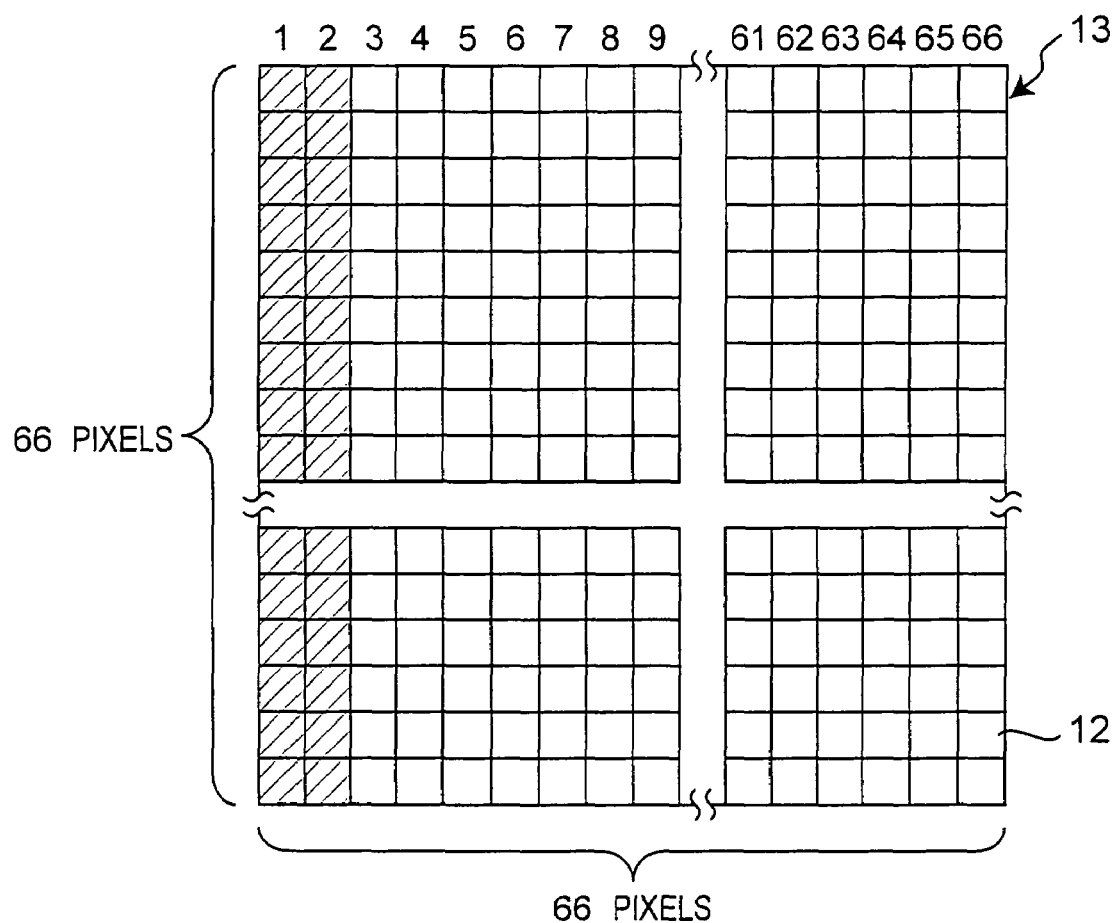
FIG. 9 is a view illustrating the writing destination of the pixel data of each pixel in an image block.

The writing destinations of the pixel data read from the memory 3 at the first stage are shown in FIG. 9. Specifically, the pixel data of the first two pixels 12, i.e., the first and second pixels in each line is written to the second temporary storage section 22. On the other hand, the pixel data of the third to the last (66th) pixels 12 in each line is written to the first temporary storage section 21.

Figure 10:
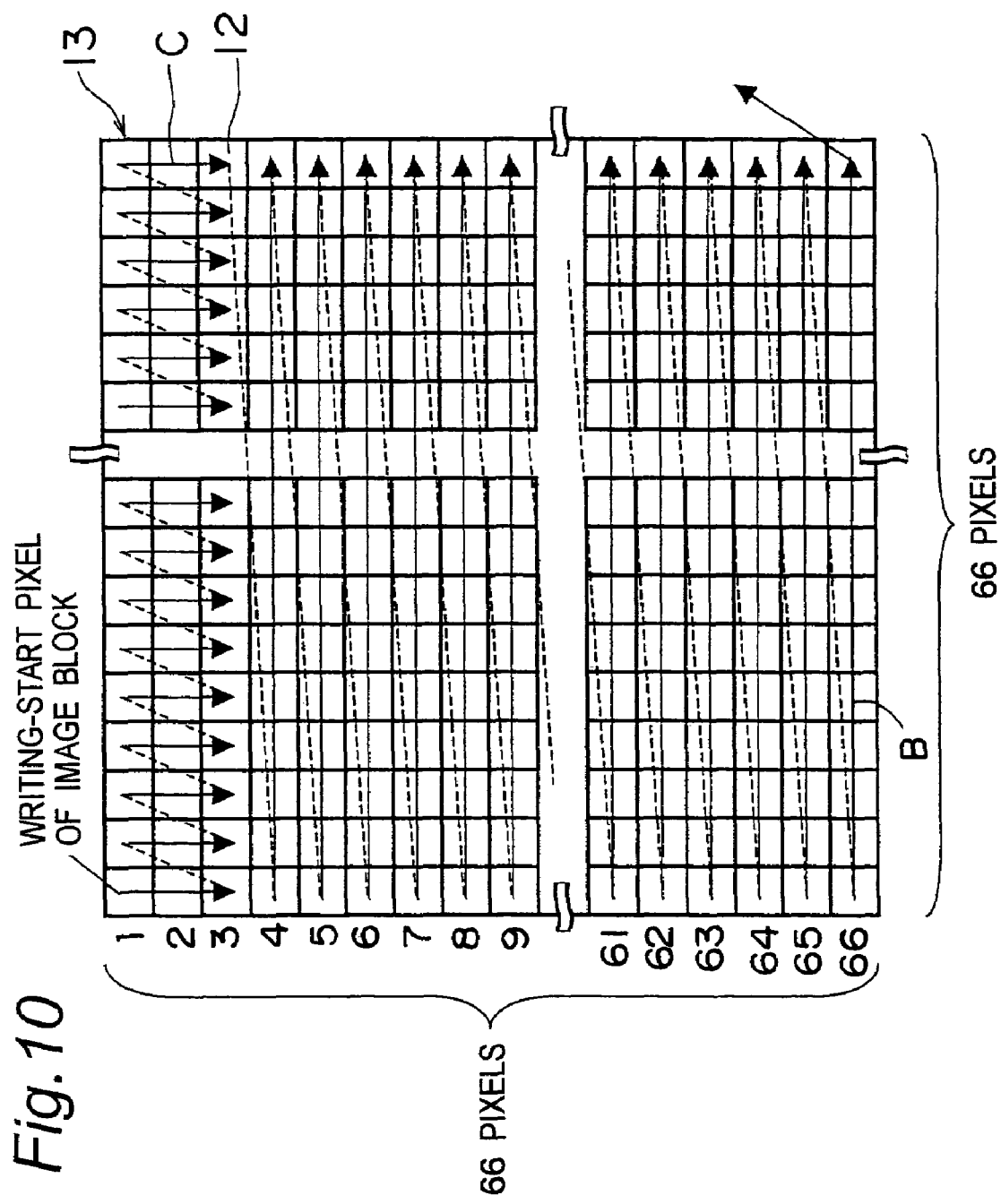
FIG. 10 is a view showing the sequence of writing the pixel data of pixels in an image block.

The sequence of reading the pixel data of the pixels 12 belonging to each image block 13 from the memory 3 and writing the pixel data in the first temporary storage section 21 or the second temporary storage section 22 at the first stage is shown in FIG. 10. Specifically, the pixel data of the pixels ranging from the fourth line to the 66th line in the image block 13 is written to the first temporary storage section 21 or the second temporary storage section 22 with shifting the reading position, pixel by pixel, in the horizontal direction in every line as indicated by an arrow "B". On the other hand, with respect to the pixel data of the pixels 12 ranging from the first line to the third line in the image block 13, the operation of sequentially reading the pixel data of the three pixels 12 arranged in the vertical direction from the memory 3 and writing the pixel data in the first temporary storage section 21 or the second temporary storage section 22 is repeated with shifting the reading position in horizontal direction as indicated by an arrow "C". As described later in detail, in accordance with this embodiment, time loss at the image block updating is eliminated by reading the pixel data in the vertical direction instead of the horizontal direction at the start of the processing of each image block 13.

At the first stage, the sequence of reading the pixel data from the memory 3 and writing the pixel data in the corresponding RAMs 21a to 21c is shifted along the addresses 33 of the RAMs 21a to 21c in the horizontal direction as indicated by an arrow "D" in FIG. 7.

At the second stage, the sequence of reading the pixel data from the RAMs 21a, 21b, and 21c of the first temporary storage section 21 and writing the pixel data in the corresponding registers 23aa, 23ba, and 23ca of the third temporary storage section 23 is shifted along the addresses 33 of the RAMs 21a to 21c in the horizontal direction as indicated by the arrow "D" in FIG. 7.

Referring to FIG. 7, the relationship between the reading point and the writing point in each of the RAMs 21a, 21b, and 21c of the first temporary storage section 21 will be described. As described above, each of the RAMs 21a, 21b, and 21c has addresses No. 1 to No. 64. The reading point is an address of each of the RAMs 21a to 21c from which pixel data is read. Further, the writing point is an address of each of the RAMs in which pixel data newly read from the memory 3 is written.

In each of the RAMs 21a to 21c, the present writing point cannot be beyond the previous reading point. For example, when the previous reading point is address No. 61 as shown in FIG. 7, the writing point is required to be address No. 60 or before the address No. 60. This is because that the writing point overtaking or being beyond the previous reading point means that new pixel data read from the memory is overwritten to addresses 22 of RAMs 21a to 21c in which pixel data that has not yet used for generating output pixel data is stored.

The writing point may be delayed from the reading point as long as that the writing point is not beyond the reading point. For example, when the reading point is address No. 61 as shown in FIG. 7, the writing point should be address No. 60 or before the address No. 60. However, it is preferable that the writing point is close to the reading point. Ideally, it is preferable that the writing point is immediately before the reading point. For example, when the reading point is the address No. 61 as shown in FIG. 7, it is ideal that the writing point is the address No. 60. The writing point immediately before the reading point means that, when pixel data is output from an address 33 of any one of the RAMs 21a to 21c to the third temporary storage section 23, overwriting with new pixel data read from the memory 3 is immediately executed at the address 33. In this status, a margin in which the writing point can be delayed from the reading point becomes maximum, whereby the storage capacities of the RAMs 21a to 21c are used most effectively.

The speed of reading pixel data from the memory 3 and writing the pixel data in the RAMs 21a to 21c of the first temporary storage section 21 and the registers 22ad to 22ce of the second temporary storage section 22 is determined on the basis of conditions regarding the writing point and the reading point described above. Specifically, when the previous writing point in one of the RAMs in which data is being written is immediately before the previous reading point, the pixel data of one pixel 12 is written to one of the RAMs 21a to 21c and the registers 22ad to 22ce in the unit time. On the other hand, when the previous writing point in one of the RAMs in which data is being written is not immediately before the reading point, the pixel data read from the memory 3 is written in any two of the RAMs 21a to 21c or both of any one of the RAMs 21a to 21c and any one of the registers 22ad to 22ce in the unit time.

The above-mentioned address control in the RAMs 21a to 21c and the above-mentioned adjustment of the writing speed, i.e., number of pixels per unit time written to the RAMs 21a to 21c and the registers 22ad to 22ce, are executed by the control circuit 9.

Figure 11:
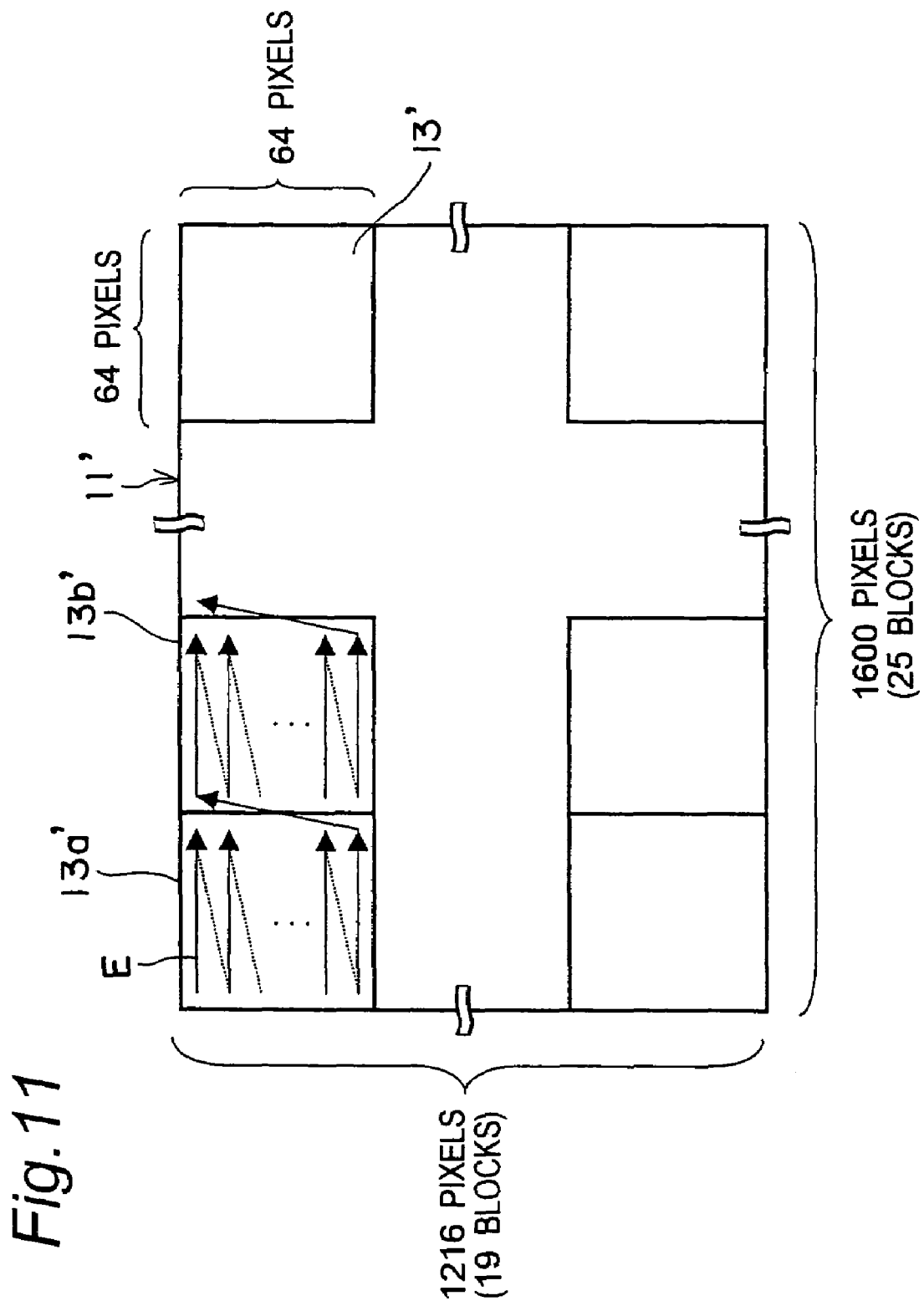
FIG. 11 is a view showing the sequence of outputting the pixel data of output pixels.

At the third stage, the sequence of generating output pixel data and outputting the pixel data to the SRAM 5 by the arithmetic circuit 20 is shown in FIG. 11. Specifically, as indicated by an arrow "E", the generated output pixel data is moved, pixel by pixel, in the horizontal direction in every image block 13. Since the arithmetic circuit 20 generates output pixel data from the pixel data of three pixels 12 adjoining in the horizontal direction and three pixels 12 adjoining in the vertical direction, the number of pixels included in an outputted image block 13' is smaller than that of pixels included in the image block 13 (see FIG. 4) of the image 11 stored in the memory 3. Specifically, 64 output pixels in the horizontal direction and 64 output pixels in the vertical direction, i.e., 4096 output pixels, are included in the image block 13'.

Figure 12:
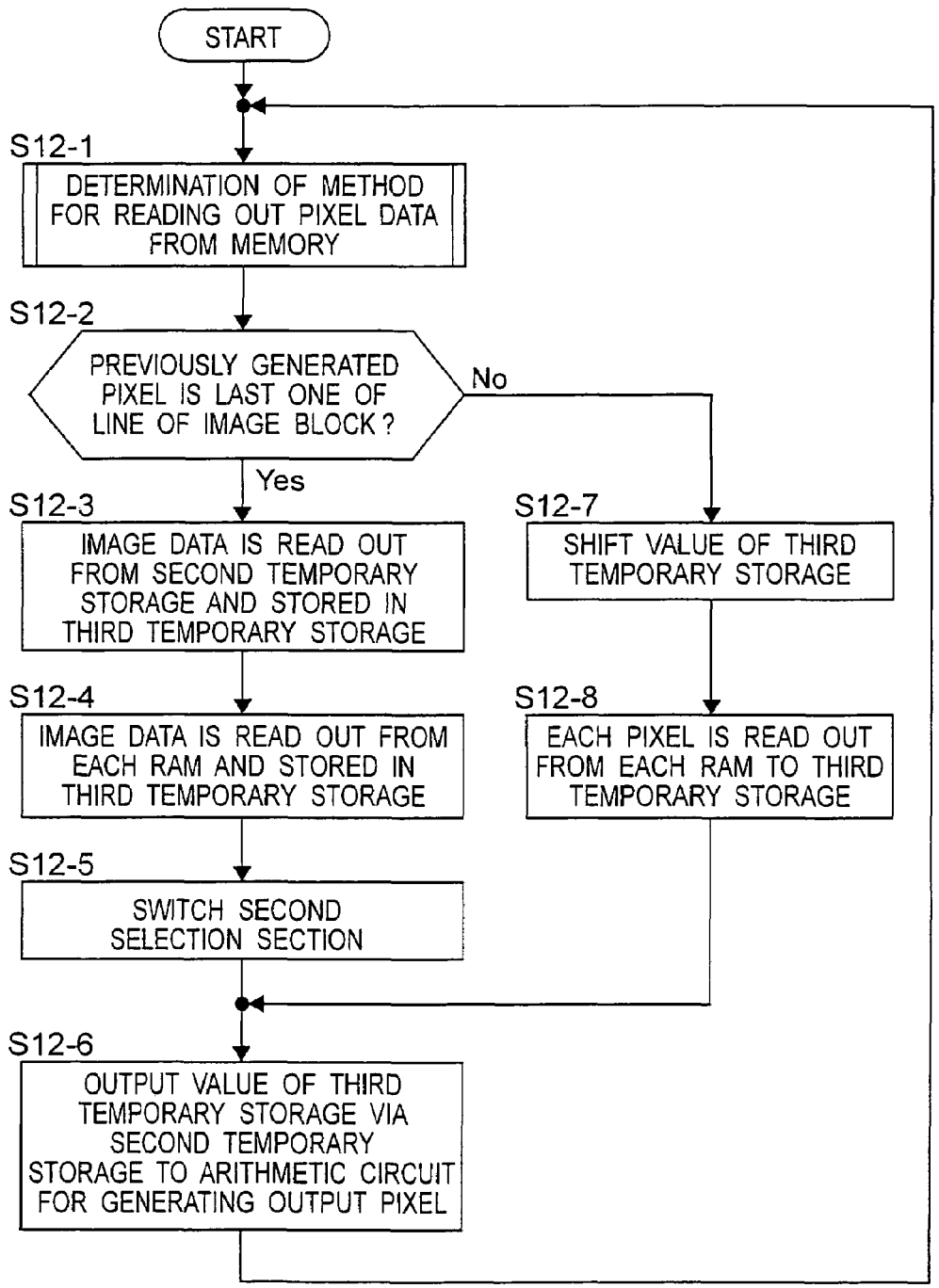
FIG. 12 is a flowchart for illustrating the operation of the YC processing circuit.

Then, the operation of the YC processing circuit 4 will be described. FIG. 12 is a flowchart showing the operation of the YC processing circuit 4 carried out in every unit time. This operation is executed by the control circuit 9. Referring to FIG. 12, step S12-1 corresponds to the above-mentioned first stage, steps S12-2 to S12-5, and steps S12-7 and S12-8 correspond to the above-mentioned second stage, and step S12-6 corresponds to the above-mentioned third stage. The arithmetic circuit 20 generates one output pixel in every unit time as described above.

At step S12-1 in FIG. 12, a method of reading pixel data from the memory 3 is determined, and pixel data reading is executed on the basis of the determined reading method. Specifically, the reading speed of pixel data, the writing destinations of pixel data having been read, and the reading direction of pixel data are determined.

Referring to FIG. 13, first, at step S13-1, a judgment is made as to whether or not the previous writing point in one of the RAMs 21a to 21c under writing is immediately before the previous reading point (condition 1). If the previous writing point is immediately before the previous reading point, the number of pixels read out in a unit time is determined to be one at step S13-2; if not immediately before the previous reading point, the number of pixels read out in the unit time is determined to be two at step S13-3. In this way, the reading speed is determined on the basis of the distance between the writing point and the reading point.

Then, at step S13-4, a judgment is made as to whether or not pixel data required for generating the first output pixel in the next line has been stored in the registers 22ad to 22ce of the second temporary storage section 22 (condition 2). If the pixel data has been stored, the pixel data read from the memory 3 is written to the RAMs 21a to 21c of the first temporary storage section 21 at step S13-5. On the other hand, if the pixel data has not been stored, the pixel data read from the memory 3 is written to the registers 22ad to 22ce of the second temporary storage section 22, or written to the registers 22ad to 22ce and the RAMs 21a to 21c of the first temporary storage section 21 at step S13-6. In this way, the writing destinations of pixel data are determined on the basis of pixel data stored in the second temporary storage section 22.

Then, at step S13-7, a judgment is made as to whether or not the pixel data read from the memory 3 and written in the RAMs 21a to 21c of the first temporary storage section 21 and/or the registers 22ad to 22ce of the second temporary storage section 22 corresponds to the pixel belonging to the first three lines of the image block 13 (condition 3). If the pixel data does not correspond to the pixel belonging to the first three lines, the reading direction is determined to be horizontal at step S13-8. On the other hand, if the pixel data corresponds to the pixel belonging to the first three lines, the reading direction is determined to be vertical at step S13-9. In this way, the reading direction is determined on the basis of whether or not the pixel 12 from which pixel data is being read is a pixel in the first lines of the image block.

FIG. 14 shows the relationship among conditions 1, 2, and 3 and reading methods, i.e., loading methods. Since there are two kinds for each of the reading speed, writing destination, and reading direction (loading direction), eight kinds of loading methods A to H exist in total. For example, in case that the previous writing point in one of the RAMs 21a to 21c under writing is immediately before the previous reading point (condition 1), that pixels required for generating the first output pixel in the next line has been stored in the second temporary storage section 22 (condition 2), and that the pixel 12 previously read from the memory 3 and written to the RAMs 21a to 21c or the like is not the pixel 12 belonging to the first three lines of the image block 13 (condition 3), the loading method A is adopted so that one pixel 12 is loaded in the horizontal direction from the memory 3 to the RAMs 21a to 21c.

After reading from the memory 3 is executed at step S12-1, a judgment is made at step S12-2 as to whether or not the previously generated output pixel is the last output pixel in a line in the image block 13', that is, a judgment is made as to whether or not there comes a time when the line updating is executed. If the output pixel is not the last pixel in the line, that is, if it is not a time for line updating, then the processing advances to step S12-7. On the other hand, if it is a time for line updating, the processing advances to step S12-3.

When line updating is not executed, steps S12-7 and S12-8 are carried out. First, at step S12-7, the pixel data of the third temporary storage section 23 is shifted from one register to another. For example, in the registers 23aa to 23cc, the pixel data in the register 23aa is shifted to the register 23ab, and the pixel data in the register 23ab is shifted to the register 23ac. Then, at step S12-8, the pixel data stored in the first temporary storage section 21 is read and stored in the third temporary storage section 23. Specifically, pixel data is read from the RAMs 21a to 21c and written to the registers 23aa, 23ba, and 23ca.

Next, at step S12-6, the pixel data stored in the third temporary storage section 23 is outputted to the arithmetic circuit 20 via the second selection section 27. More specifically, the pixel data is outputted from the nine registers 23aa to 23cc of the third temporary storage section 23 to the multipliers 31a to 31c of the arithmetic circuit 20. The arithmetic circuit 20 generates an output pixel from the inputted pixel data.

At the line updating, steps S12-3 to S12-5 are executed. First, at step S12-3, the setting of the first selection section 26 is changed to the lower position, whereby the pixel data stored in the second temporary storage section 22 is read and stored in the third temporary storage section 23. Specifically, the pixel data is respectively outputted from the registers 22ad and 22ae to the registers 23ab and 23ac, from the registers 22bd and 22be to the registers 23bb and 23bc, or from the registers 22cd and 22ce to the registers 23cb and 23cc. Next, at step S12-4, the pixel data stored in the first temporary storage section 21 is read and stored in the third temporary storage section 23. Specifically, the pixel data is read from the RAMs 21a to 21c and written to the registers 23aa, 23ba, and 23ca. Next, at step S12-5, the setting of the second selection section 27 is changed. Specifically, the setting of the second selection section 27 is changed so that the pixel data of the latest line is inputted to the multiplier 31a of the arithmetic circuit 20, so that the pixel data of the latest line but one is input to the multiplier 31b, and so that the pixel data of the latest line but two is input to the multiplier 31c. Then, at step S12-6, the pixel data stored in the third temporary storage section 23 is output to the arithmetic circuit 20 via the second selection section 27, and the arithmetic circuit 20 generates an output pixel from the inputted pixel data.

FIGS. 15 to 19 show examples obtained when the YC processing circuit 4 executes YC processing for the pixel data stored in the memory 3 by repeating the processing shown in the flowchart of FIG. 12 at the unit time intervals.

First, FIGS. 15 and 16 show the operation statuses of the YC processing circuit 4 at respective times from time t, at which the output pixel (62, 63) in one frame of image is generated to time t+143. In FIGS. 15 and 16, an item 1 represents a method of loading pixel data from the memory 3 to the RAMs 21a to 21c and the registers 22ad to 22cd. An item 2 represents the writing destination of pixel data read from the memory 3. An item 3 represents a pixel written from the memory 3 to the RAMs 21a to 21c and the like. Items 4 and 5 respectively represent the writing destination of pixel data and a pixel whose pixel data is read when the two pixels 12 are read in the unit time. Items 6 and 7 respectively represent the writing point and reading point of the RAMs 21a to 21c at each time (see FIG. 7). An item 8 represents the selection of setting status of the first selection section 26. An item 9 represents an output pixel.

Figure 18:
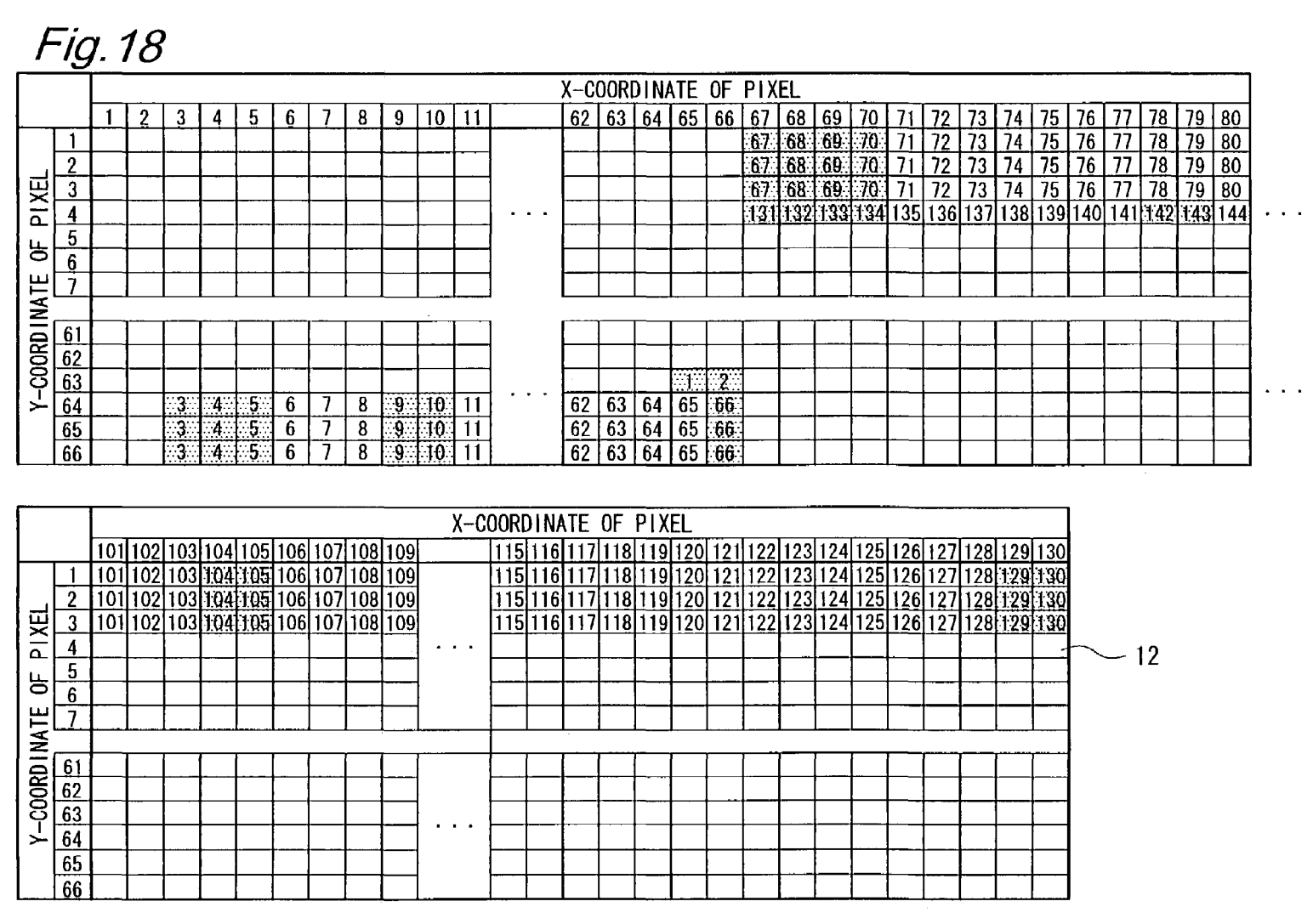
Figure 19:
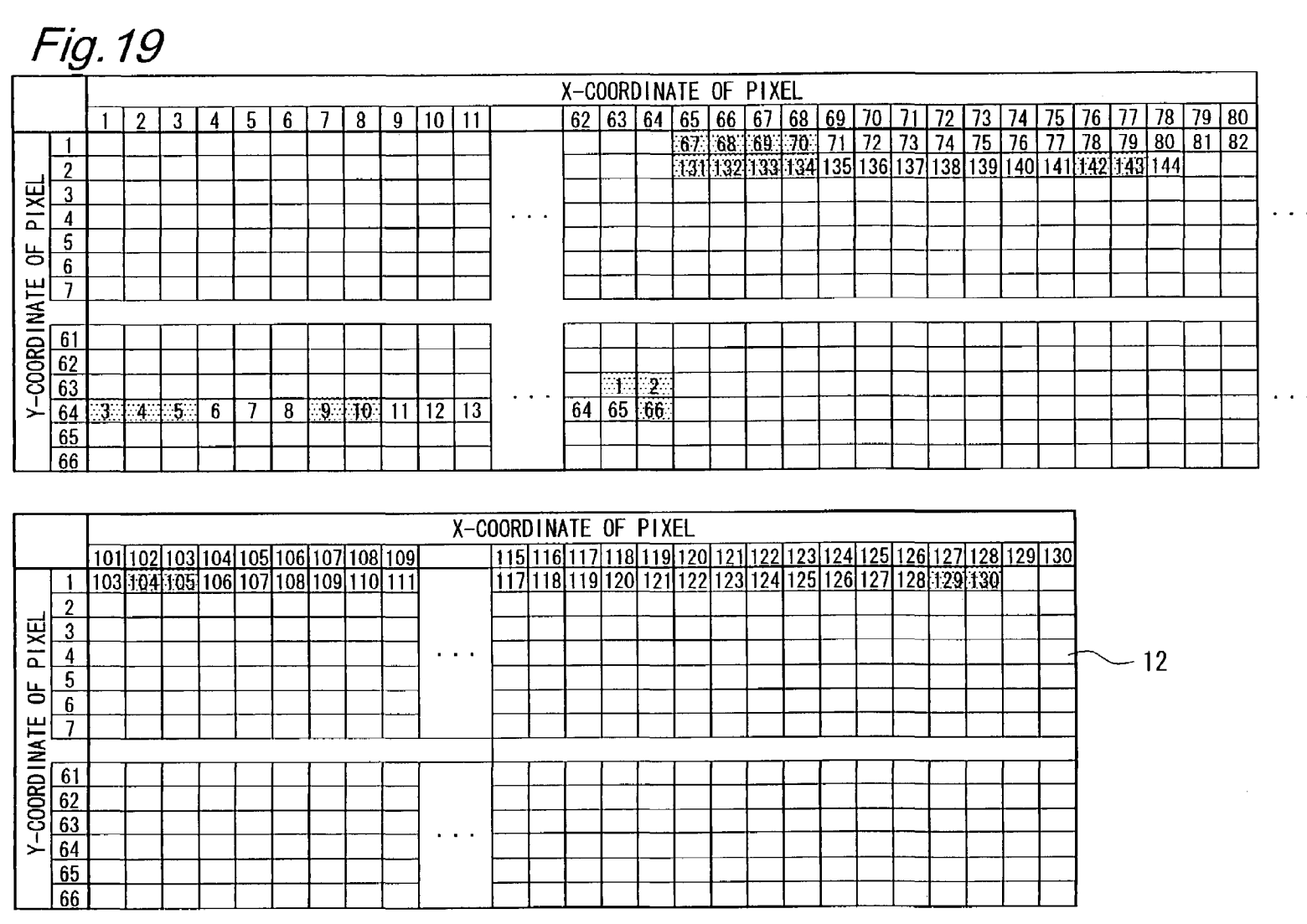

FIG. 17 shows times at which pixel data is read from the memory 3 and written to the RAMs 21a to 21c of the first temporary storage section 21 or the registers 22ad to 22ce of the second temporary storage section 22 by the processing at step S12-1 in FIG. 12. Further, FIG. 18 shows times at which pixel data is read from the RAMs 21a to 21c and written to the registers 23aa, 23ba, and 23ca of the third temporary storage section 23 by the processing at steps S12-4 and S12-8 in FIG. 12. Furthermore, FIG. 19 shows times at which output pixel data is generated by the processing at step S12-6 in FIG. 12. In these FIGS. 17 to 19, the numerals in the blocks indicating pixels 12 represent times. For example, the numeral "4" shown in the pixel 12 (65, 1) in FIG. 17 indicates that the pixel data of this pixel is read from the memory 3 at time 4. Further, FIGS. 17 to 19 shows time "1" at which the pixel data of the output pixel (63, 63) belonging to the first image blocks 13*a* and 13*a*' (see FIGS. 4 and 11) is generated to time t144 at which the pixel data of the output pixel (78, 2) belonging to the second image blocks 13*b* and 13*b*' is generated. In FIGS. 17 to 19, the numerals in the blocks represent times. The times in the respective pixels in FIGS. 17 to 19 correspond to the cases wherein "t" is 0 in FIGS. 15 and 16.

As shown in FIG. 18, pixel data writing from each of the RAMs 21*a* to 21*c* of the first temporary storage section 21 to the third temporary storage section 23 merely advances in the horizontal direction pixel by pixel. As shown in FIG. 19, the generation of output pixel by the arithmetic circuit 20 also advances in the horizontal direction pixel by pixel. On the other hand, pixel data writing from the memory 3 to each of the RAMs 21*a* to 21*c* of the first temporary storage section 21 or the registers 22*ad* to 22*ce* of the second temporary storage section 22 (at step S12-1 in FIG. 12) is executing according to FIGS. 13 and 14, whereby the reading direction is changed as shown in FIG. 17, and the reading speed and reading destination are also changed.

According to steps S13-4 to S13-6 in FIG. 13 and the condition 2 in FIG. 14, when pixel data required for generating the pixel data of the first output pixel in the next line has not been stored in the second temporary storage section 22, the pixel data of head and second pixels 12 in the next line is stored in the registers 22*ad* to 22*ce* of the second temporary storage section 22. For example, in FIGS. 15 to 17, at times 4 to 9 and times 68, 69, 132, and 133, the pixel data of the first or second pixel 12 in a line read from the memory 3 is written to the registers 22*ad* to 22*ce* instead of the RAMs 21*a* to 21*c* corresponding to the line. In the case of line updating at step S12-2 in FIG. 12, the pixel data stored in the registers 22*ad* to 22*ce* is written to the third temporary storage section 23 at step S12-3. The pixel data written from the second temporary storage section 22 to the third temporary storage section 23 is output to the arithmetic circuit 20 at step S12-6, together with the pixel data of the third pixel in the next line, which is written from the first temporary storage section 21 to the third temporary storage section 23 at step S12-4, whereby all the pixel data required for the generation of output pixel data is supplied to the arithmetic circuit 20. As described above, time loss at the line updating is eliminated by providing the second temporary storage section 22 in addition to the RAMs 21*a* to 21*c* of the first temporary storage section 21 and by storing the pixel data of the first and second pixels in the next line in the second temporary storage section 22 in advance before the line updating.

On the basis of step S13-7 in FIG. 13 and the condition 3 in FIG. 14, the direction of reading pixel data from the memory 3 to the first temporary storage section 21 and the second temporary storage section 22 is changed. At step S13-7, when the pixel data previously written from the memory 3 to the first temporary storage section 21 or the second temporary storage section 22 does not correspond to the pixel 12 within the first three lines, the pixel data of the pixels in the two lines among the pixel data required for generating the pixel data in the next line has already been stored in the RAMs 21*a* to 21*c*. Therefore, maintaining reading direction in horizontal direction in this case does not cause loss at the image block updating. However, at step S13-7, when the pixel data previously written from the memory 3 to the first temporary storage section 21 or the second temporary storage section 22 corresponds to the pixel 12 within the first three lines, the generation of the pixel data of the pixels in the next line corresponds to the generation of the pixel data of the pixels in a line of the next image block 13, and the pixel data required for generating the pixel data in the next line has not been yet stored in the RAMs 21*a* to 21*c* at all. Therefore, if the reading direction remains horizontal, loss occurs at the image block updating. In this case, the reading direction is changed to vertical. By setting the reading direction to vertical in the first three or less lines of the image block 13 as described above, after the last output pixel of the previous image block 13 is generated, the first output pixel of the next image block 13 can be generated immediately, whereby the time loss at the image block updating can be reduced. For example, as shown in FIG. 19, the last output pixel (64, 64) of the first image block 13*a*' (see FIG. 11) is generated at time 66, and the first output pixel (65, 1) of the second image block 13' is generated at time 67, immediately after time 66. This is achieved by reading the pixel data of the pixels 12 belonging to the first three lines of the second image block 13' at time 4 and thereafter as shown in FIG. 17.

The speed of reading pixel data from the memory 3 and writing the pixel data to the RAMs 21*a* to 21*c* or the registers 22*ad* to 22*ce* is changed to one pixel per unit time or two pixels per unit time according to steps S13-1 to S13-3 in FIG. 13 and the condition 1 in FIG. 14 depending on the distance between the writing point and the reading point in the RAMs 21*a* to 21*c*. When the writing point is immediately before the reading point at step S13-1 in FIG. 13, it is an ideal status wherein the storage capacities of the RAMs 21*a* to 21*c* are used most effectively as described above. Therefore, pixel data is read from the memory 3 to the RAMs 21*a* to 21*c* at a rate of one pixel per unit time (at the same speed as the output pixel data generation speed at the arithmetic circuit 20) so that the writing point does not become closer to the reading point. On the other hand, when the writing point is not immediately before the reading point at step S13-1 in FIG. 13, the writing point is delayed from the reading point. Therefore, pixel data is read from the memory 3 to the RAMs 21*a* to 21*c* at a rate of two pixels per unit time (at the speed of two times that of the output pixel data generation at the arithmetic circuit 20) so that the writing point catches up to the reading point. Although the image block 13 has 66 pixels in the horizontal direction, each of the RAMs 21*a* to 21*c* has 64 addresses 33 fewer than 66. However, by controlling the speed of writing to the RAMs 21*a* to 21*c* so that the writing point does not become beyond the reading point and so that the writing point becomes close to the reading point, the storage capacities of the RAMs 21*a* to 21*c* are used effectively, such that processing does not cause time loss at the above-mentioned line updating and image block updating can be attained.

Next, referring to FIG. 12 and FIGS. 20 to 37, the operation of the YC processing circuit 4 from time t+1 to time t+10 in FIG. 15 (from time 1 to time 10 in FIGS. 17 to 19) will be described in detail.

Figure 20:
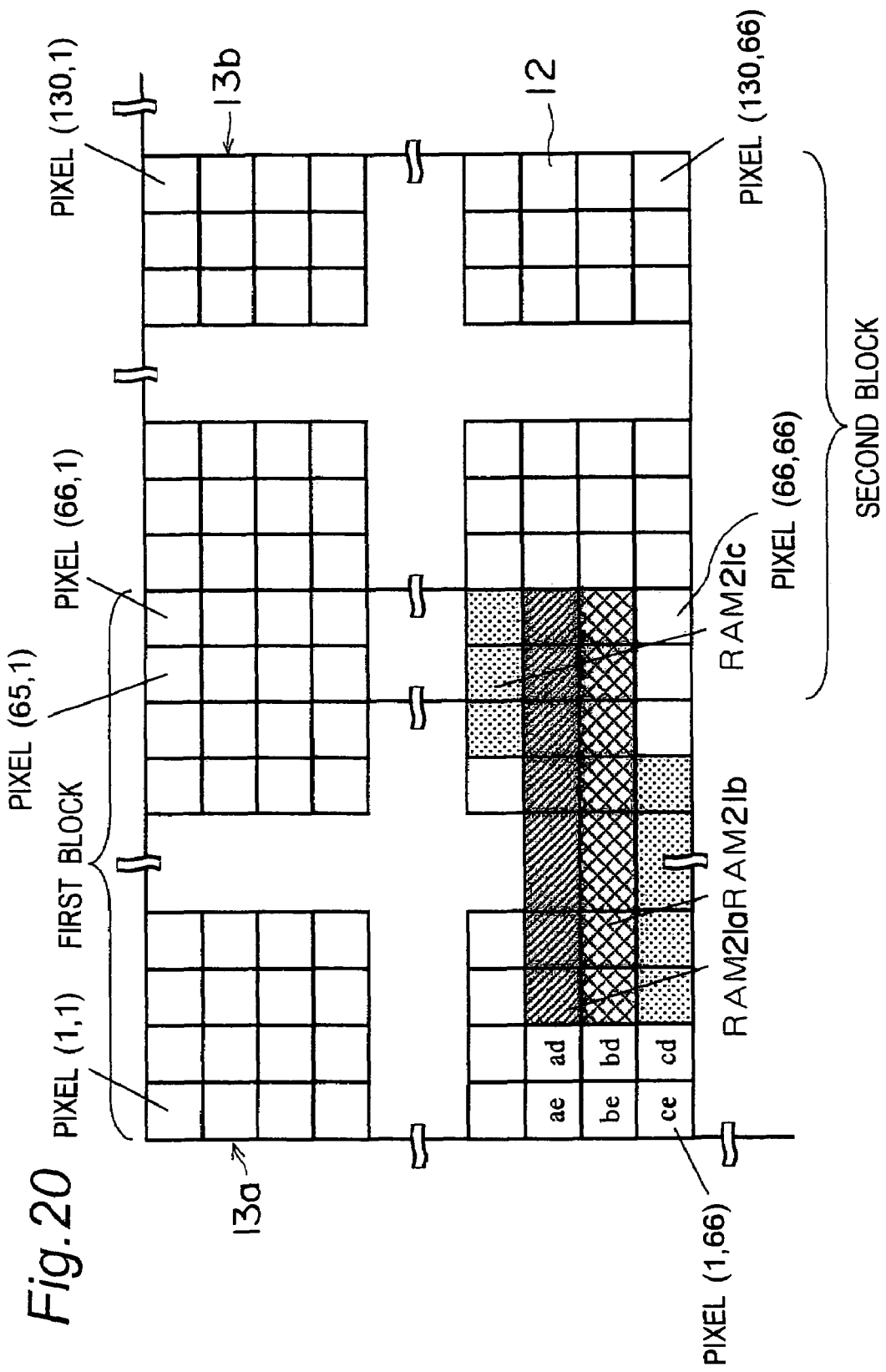
FIG. 20 is a schematic view showing pixel data stored in the first and second temporary storage sections immediately after time "t"

FIG. 20 shows the pixel data stored in the RAMs 21*a* to 21*c* of the first temporary storage section 21 and the registers 22*ad* to 22*ce* of the second temporary storage section 22 immediately before step S12-1 in FIG. 12. The pixel data of the pixels (3, 64) to (66, 64) is stored in the RAM 21*a*. Further, the pixel data of the pixels 12 (3, 65) to (66, 65) is stored in the RAM 21*b*. Furthermore, the pixel data of the pixels (64, 63) to (66, 63) and the pixels (3, 66) to (63, 66) is stored in the RAM 21*c*. The pixel data of the six pixels (1, 64) to (2, 66) is stored in the registers 22*ad* to 22*ce*.

Figure 21:
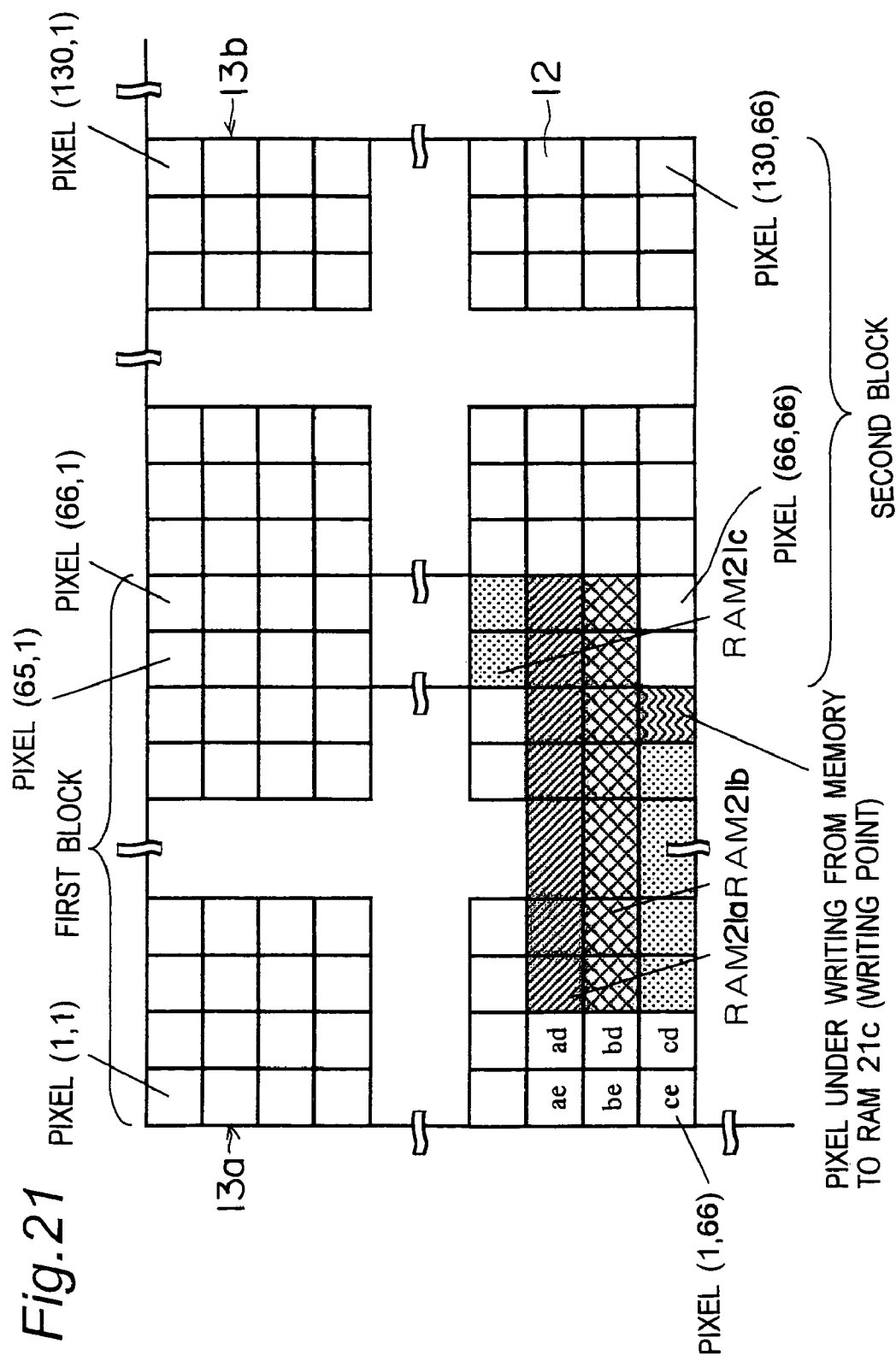
FIG. 21 is a schematic view showing pixel data stored in the first and second temporary storage sections after pixel data is read from the memory to the RAMs at time t+1.

At step S12-1 in FIG. 12, overwriting with the pixel data of the pixel (64, 66) read from the memory 3 is carried out for the address 33 of the RAM 21*a* in which the pixel data of the pixel (64, 63) is stored. FIG. 21 shows the pixel data stored in the RAMs 21*a* to 21*c* and the registers 22*ad* to 22*ce* after this overwriting.

This overwriting is determined according to FIG. 14. First, with respect to the condition 1, the previous writing point of the RAM 21c under writing is the address in which the pixel data of the pixel (63, 66) is stored, and the previous reading point is the address in which the pixel data of the pixel (64, 63) is stored, whereby the writing point is immediately before the reading point. With respect to the condition 2, the pixel data of the pixels (1, 64) to (2, 66) required for generating the pixel data of the pixels in the next line (the 64th line) has already been stored in the second temporary storage section 22. With respect to the condition 3, the pixel (64, 66) to be read from the memory 3 is not a pixel in the first three lines of the image block 13. Therefore, the loading method A is selected, and the pixel data of the pixel (64, 66) is read from the memory 3 and written to the RAM 21c. By overwriting with the pixel data of the pixel (64, 66), the pixel data of the pixel (64, 63) is erased from the RAM 21c. Since the pixel data of this pixel (64, 63) is not used again for the generation of output pixel data, no problem occurs.

Figure 22:
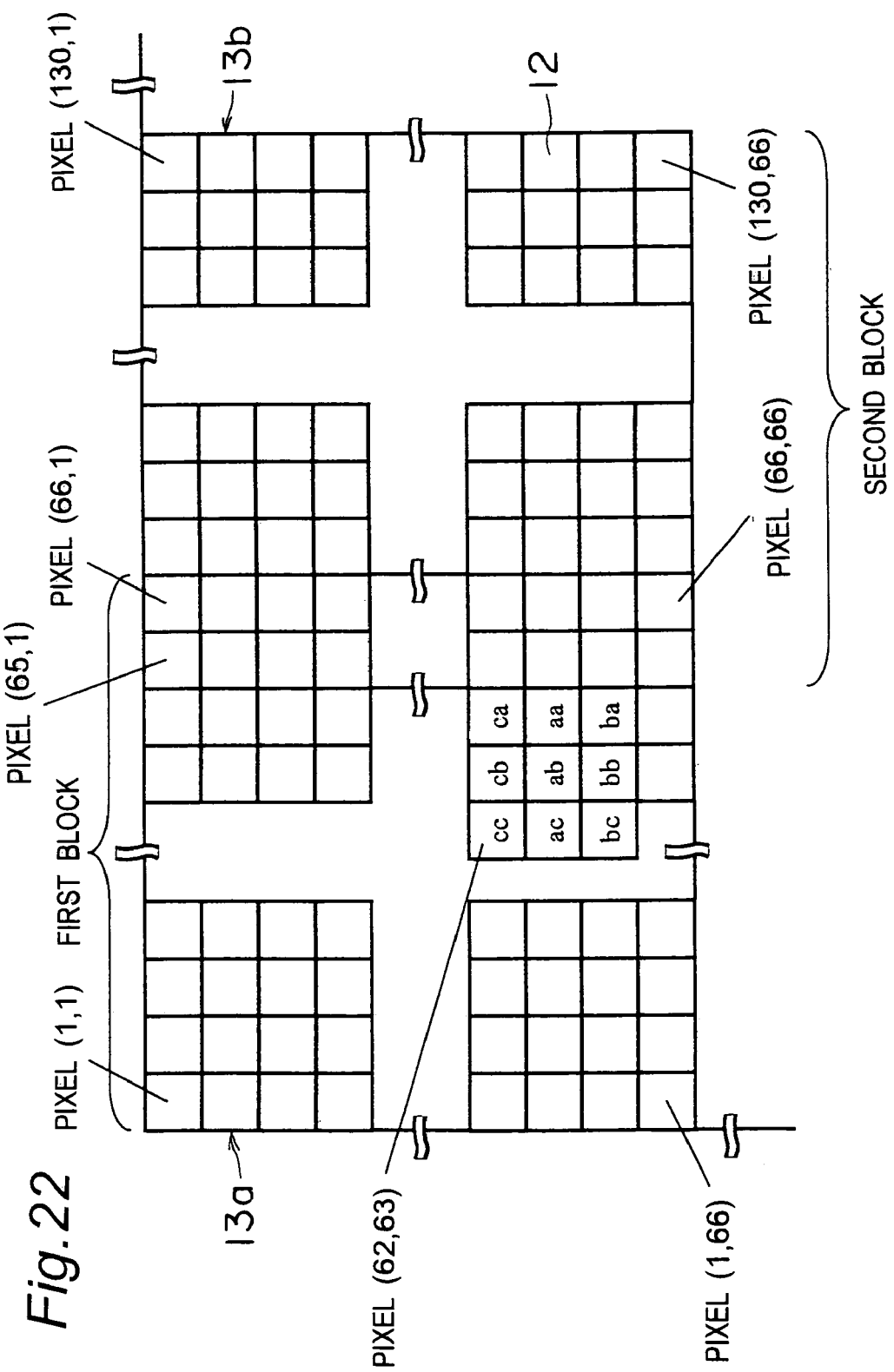
FIG. 22 is a schematic view showing pixel data stored in the third temporary storage section before the shifting of the registers of the third temporary storage section at time t+1.

FIG. 22 shows the status of the pixel data stored in the third temporary storage section 23 immediately after the pixel data of the pixel (64, 66) is written from the memory 3 to the RAM 21c at step S12-1 of time t+1, that is, immediately before shifting is carried out at the third temporary storage section 23. The pixel data of the pixels (62, 64) to (64, 64) is stored in the registers 23aa to 23ac, the pixel data of the pixels (62, 65) to (64, 65) is stored in the registers 23ba to 23bc, and the pixel data of the pixels (62, 63) to (64, 63) is stored in the registers 23ca to 23cc. At time "t", the arithmetic circuit 20 has already generated new pixel data of the pixel (62, 63) from the pixel data of these nine pixels and has outputted the data.

Figure 23:
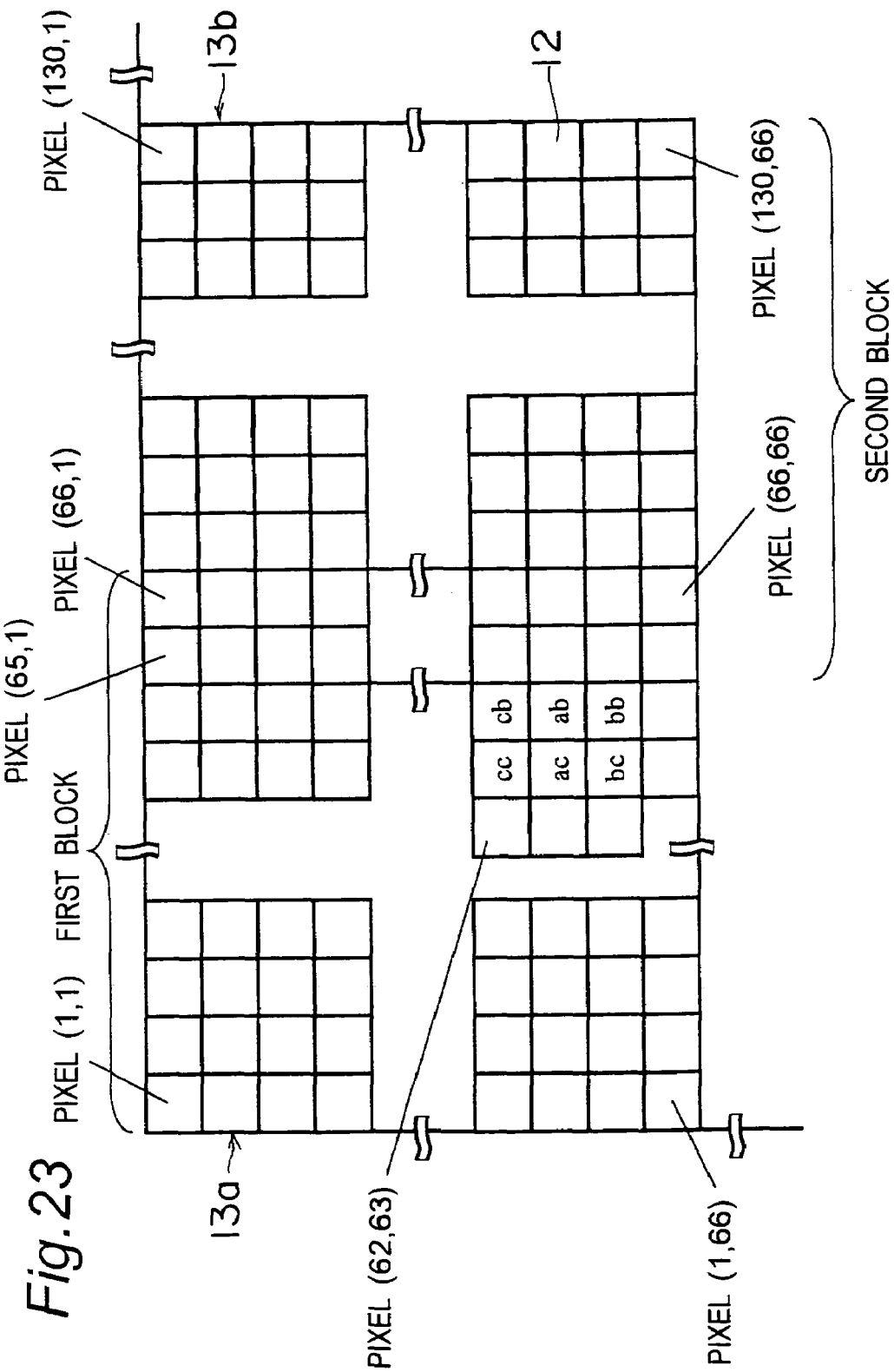
FIG. 23 is a schematic view showing pixel data stored in the third temporary storage section after the shifting of the registers of the third temporary storage section at time t+1.

FIG. 23 shows the status of the pixel data stored in the third temporary storage section 23 immediately after shifting is carried out at the third temporary storage section 23 at step S12-7 of time t+1. The pixel (62, 63) generated previously (at time "t") does not correspond to the last pixel (64, 63) in the 63th line of the image block 13 (at step S12-2). Therefore, data in the third temporary storage section 23 is shifted at step S12-8. Specifically, the pixel data in the register 23ab is shifted to the register 23ac and rewritten, and the pixel data in the register 23aa is shifted to the register 23ab and rewritten. Similarly, pixel data in the other registers 23bb, 23bc, 23cd, and 23cc is also rewritten.

Figure 24:
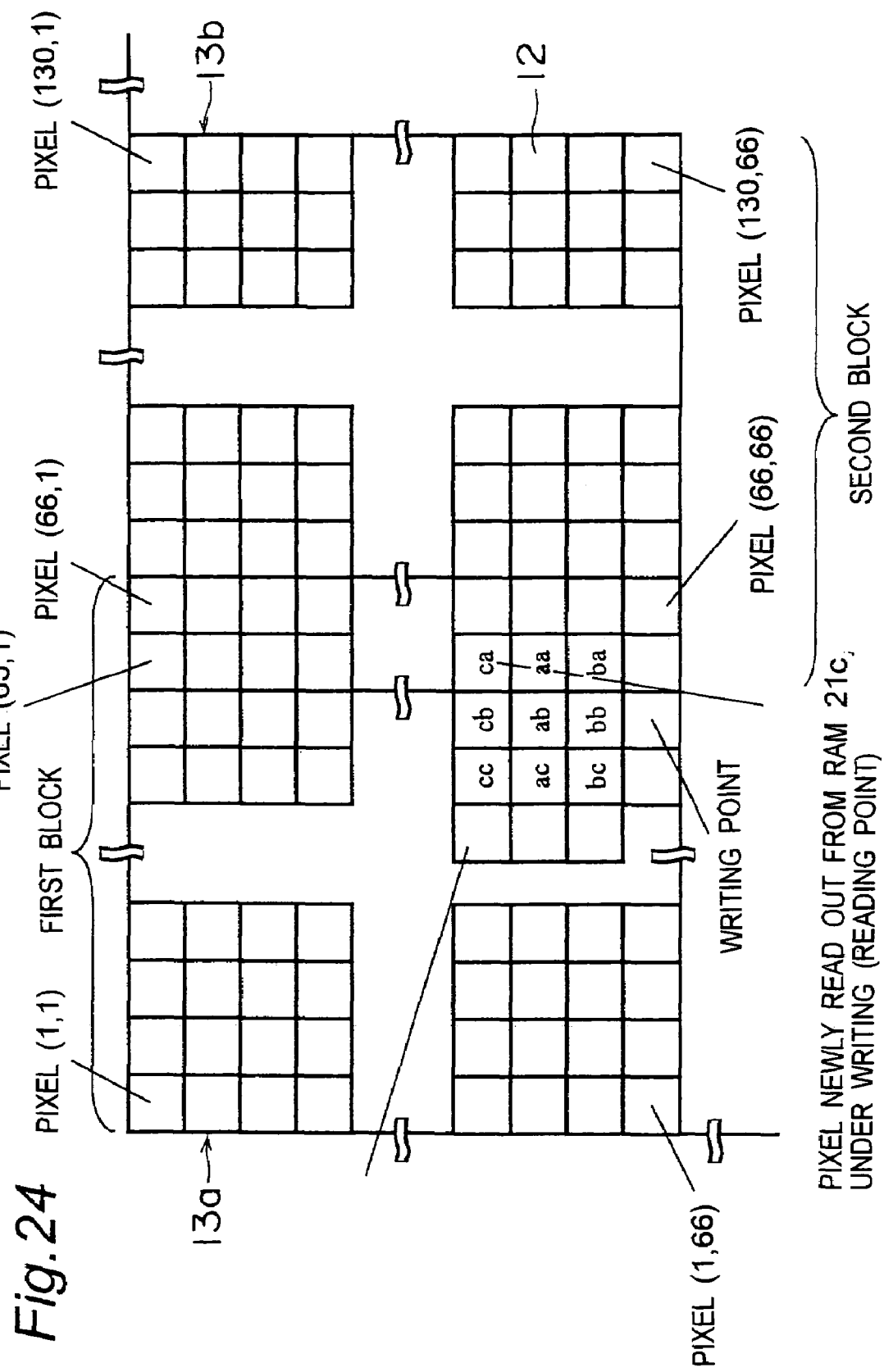
FIG. 24 is a schematic view showing pixel data stored in the third temporary storage section after the pixel data of pixels is transferred pixel by pixel, from the RAMs to the third temporary storage section at time t+1.

FIG. 24 shows the status of the pixel data stored in the third temporary storage section 23 immediately after step S12-8 of time t+1. At step S12-8, the pixel data of the pixel (65, 63) is read from the RAM 21c and written to the register 23ca, the pixel data of the pixel (65, 64) is read from the RAM 21a and written to the register 23aa, and the pixel data of the pixel (65, 65) is read from the RAM 21b and written to the register 23ba. Since the pixel data of the six pixels (63, 63) to (64, 65) has already been stored in the third temporary storage section 23 at step S12-7, the pixel data of the nine pixels (63, 63) to (65, 65) is thus stored in the third temporary storage section 23. Since this is the last time when the pixel data of the pixel (65, 63) is read from the RAM 21c, it is not necessary to store the pixel data of the pixel (65, 63) hereafter. In other words, even if the pixel data of the pixel (65, 63) is erased by overwriting, subsequent image processing can be carried out without problems.

Figure 25:
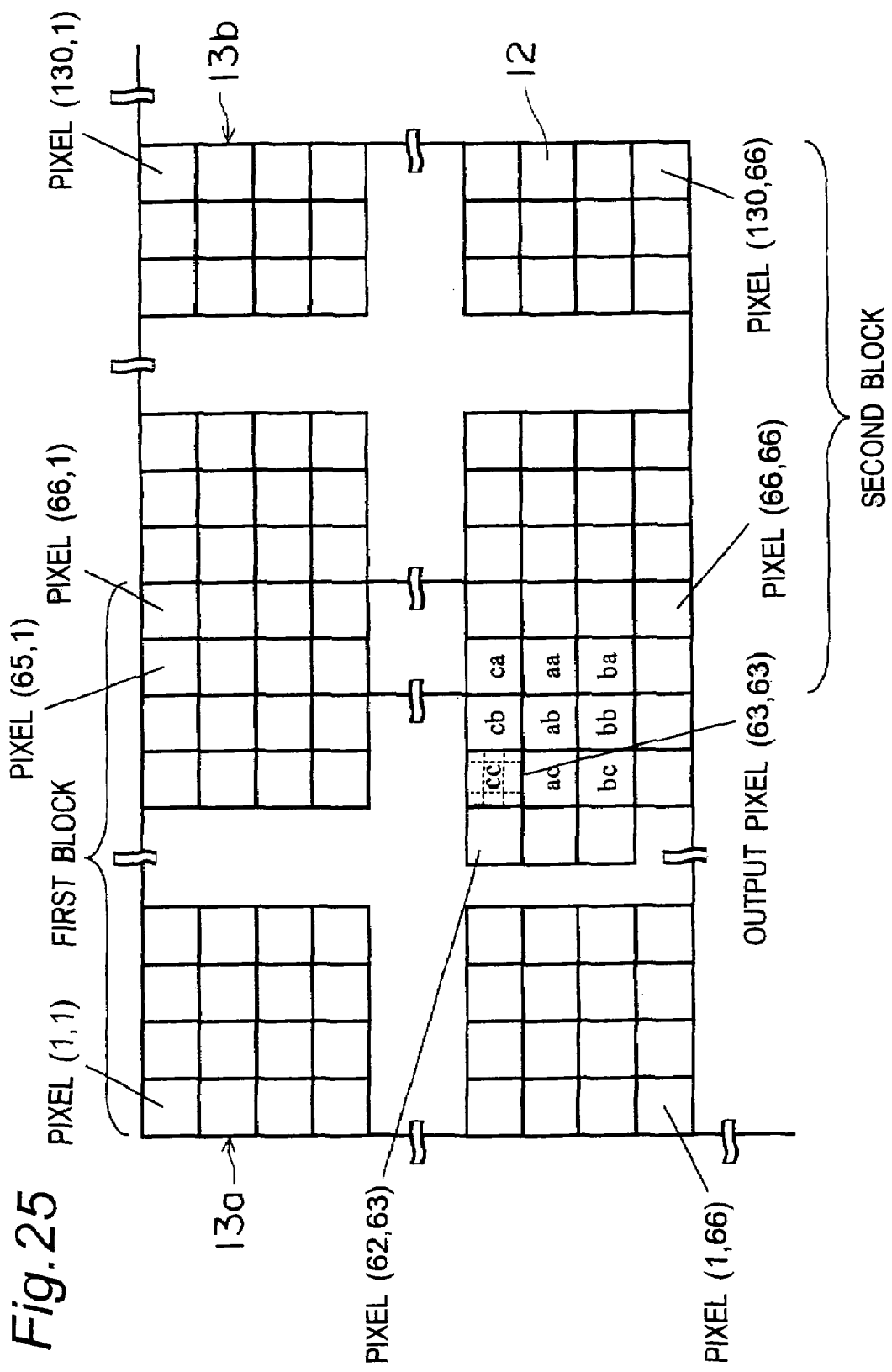
FIG. 25 is a schematic view showing pixel data stored in the third temporary storage section when the pixel data of an output pixel is generated at time t+1.

FIG. 25 shows the output pixel generated at time t+1 and the status of the pixel data stored in the third temporary storage section 23, in other words, the status immediately after step S12-6. At step S12-6, the pixel data of the nine pixels (63, 63) to (65, 65) stored in the third temporary storage section 23 is input to the arithmetic circuit 20 via the second selection section 27, and the arithmetic circuit 20 generates the pixel data of the output pixel (63, 63). The pixel data of the pixels in the 64th line is stored in the registers 23aa to 23ac, the pixel data of the pixels in the 65th line is stored in the registers 23ba to 23bc, and the pixel data of the pixels in the 63th line is stored in the registers 23ca to 23cc. Therefore, by the second selection section 27, the registers 23aa to 23ac are connected to the multiplier 31b, the registers 23ba to 23bc are connected to the multiplier 31c, and the registers 23ca to 23cc are connected to the multiplier 31a.

Figure 26:
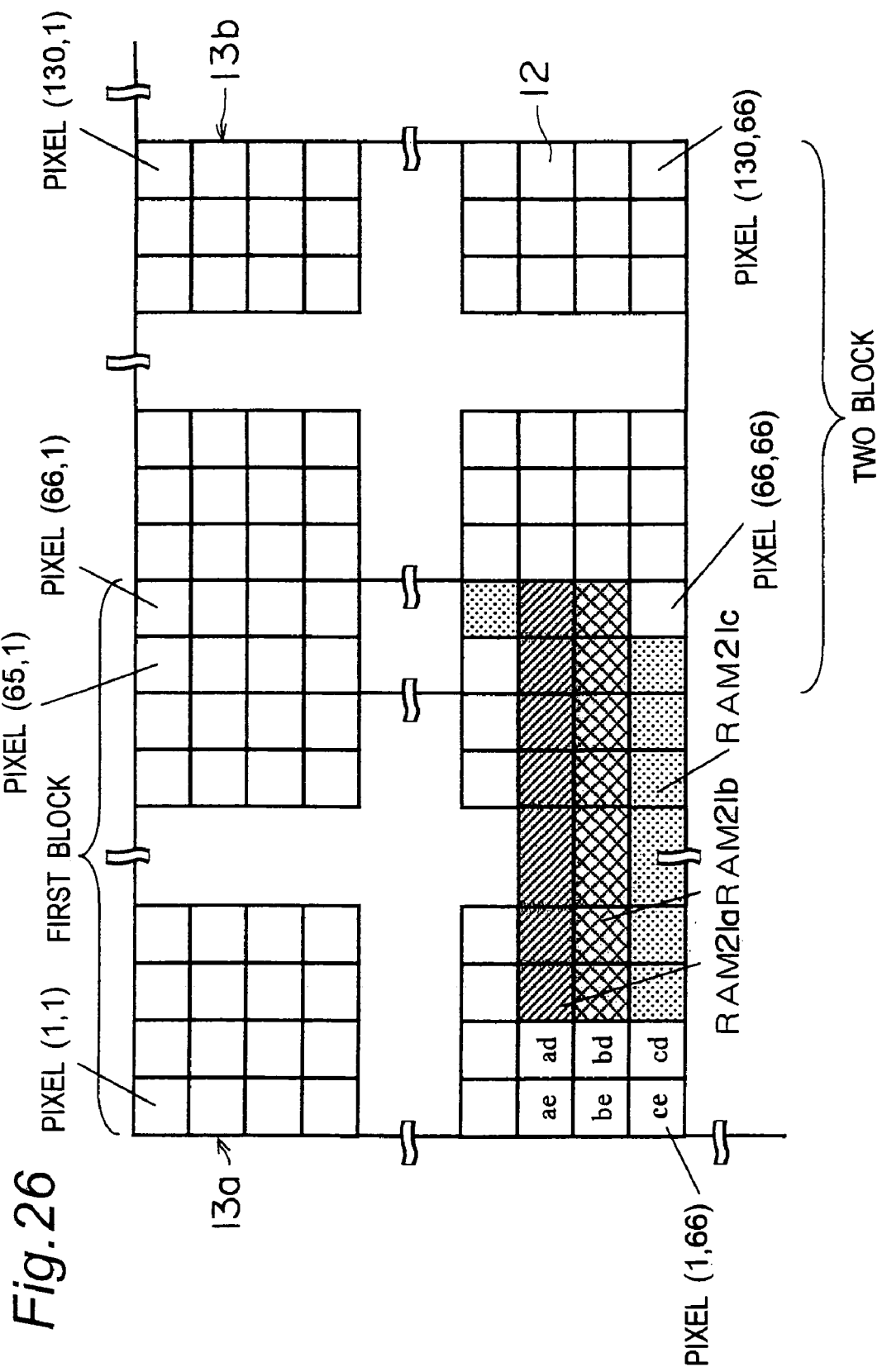
FIG. 26 is a schematic view showing pixel data stored in the first and second temporary storage sections immediately after time t+2.

The operation at time t+2 is similar to the operation at time t+1. FIG. 26 shows the status of the pixel data stored immediately after the pixel data of the pixel (64, 63) is generated at time t+2, in other words, the status immediately before step S12-1 of time t3. The pixel data of the pixels (3, 64) to (66, 64) is stored in the RAM 21a, the pixel data of the pixels (3, 65) to (66, 65) is stored in the RAM 21b, and the pixel data of the pixel (66, 63) and the pixels (3, 66) to (65, 66) is stored in the RAM 21c. Further, the pixel data of the pixels (1, 64) to (2, 66) is stored in the second temporary storage section 22.

Figure 27:
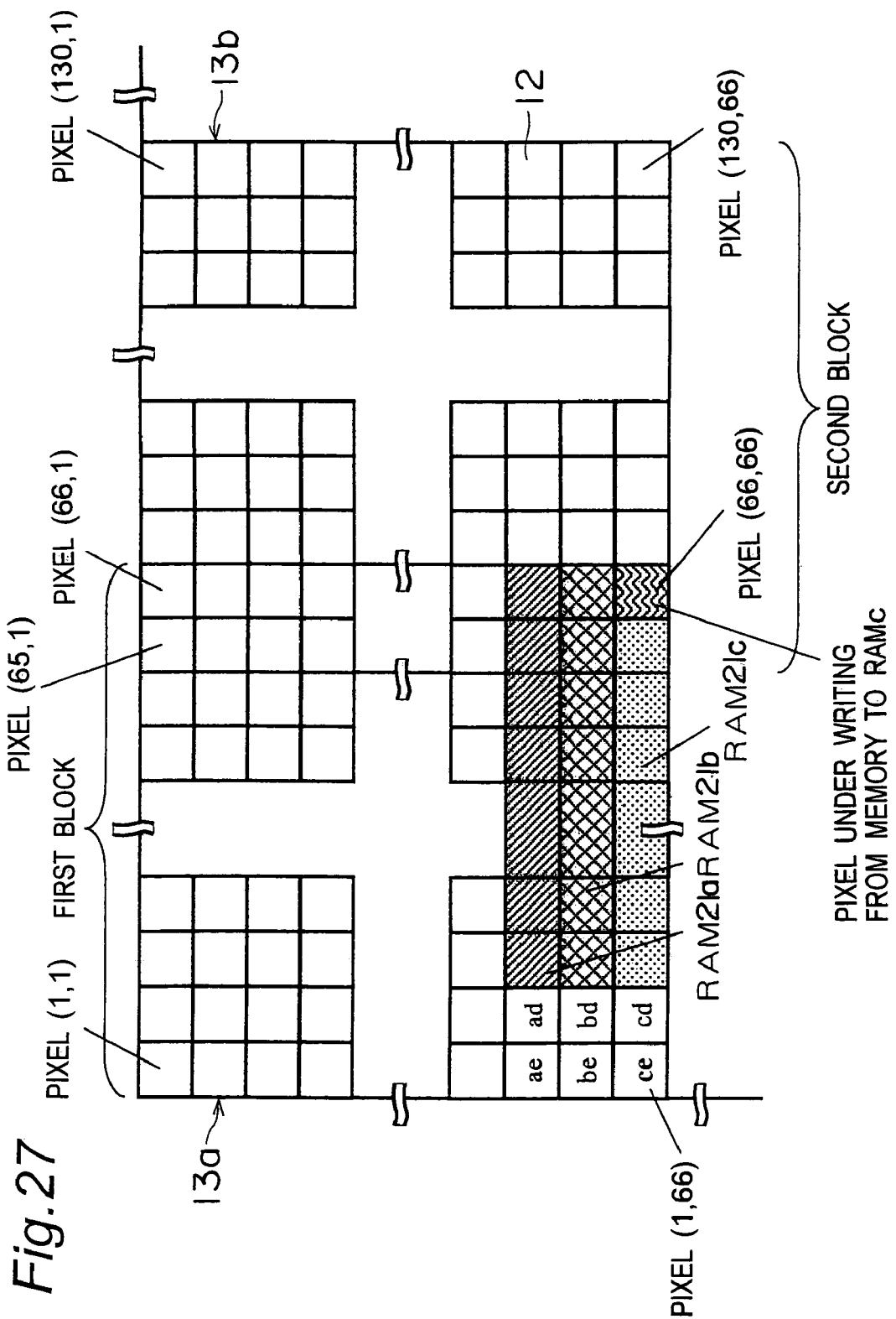
FIG. 27 is a schematic view showing pixel data stored in the first and second temporary storage sections after pixel data is read from the memory to the RAMs at time t+3.

FIG. 27 shows the status of the pixel data stored in the first temporary storage section 21 and the second temporary storage section 22 immediately after step S12-1 at time t+3. At step S12-1, on the basis of the judgment results of the conditions 1 to 3, overwriting with the pixel data of the pixel (66, 66) read from the memory 3 is carried out for the storage area of the RAM 21c in which the pixel data of the pixel (66, 63) is stored.

Figure 28:
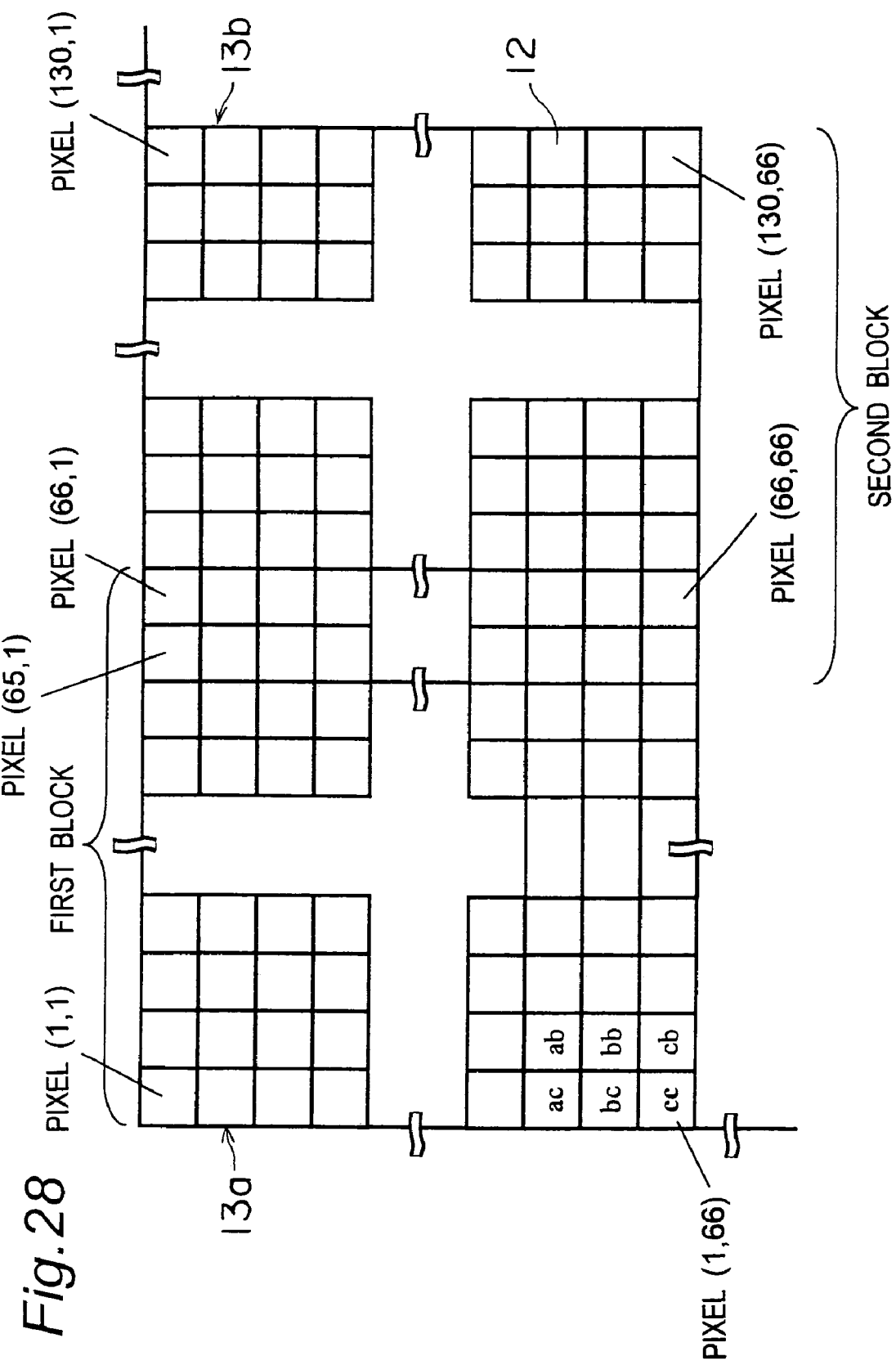
FIG. 28 is a schematic view showing pixel data stored in the third temporary storage section after pixel data is transferred from the second temporary storage section to the third temporary storage section.

FIG. 28 shows the status of the pixel data stored in the third temporary storage section 23 immediately after the pixel data of the six pixels (1, 64) to (2, 66) stored in the second temporary storage section 22 is read and written to the third temporary storage section 23 at step S12-3 of time t+3. The pixel (64, 63) generated previously (at time t+2) corresponds to the last pixel (64, 63) in the 63th line of the image block 13. Therefore, according to step S12-2, pixel data is loaded from the second temporary storage section 22 to the third temporary storage section 23 at step S12-3. Specifically, the setting of the first selection section 26 is changed to the lower position, whereby the pixel data in the register 22ad is written to the register 23ab, the pixel data in the register 22ae is written to the register 23ac, the pixel data in the register 22bd is written to the register 23bb, the pixel data in the register 22be is written to the register 23bc, the pixel data in the register 22cd is written to the register 23cb, and the pixel data in the register 22ce is written to the register 23cc.

Figure 29:
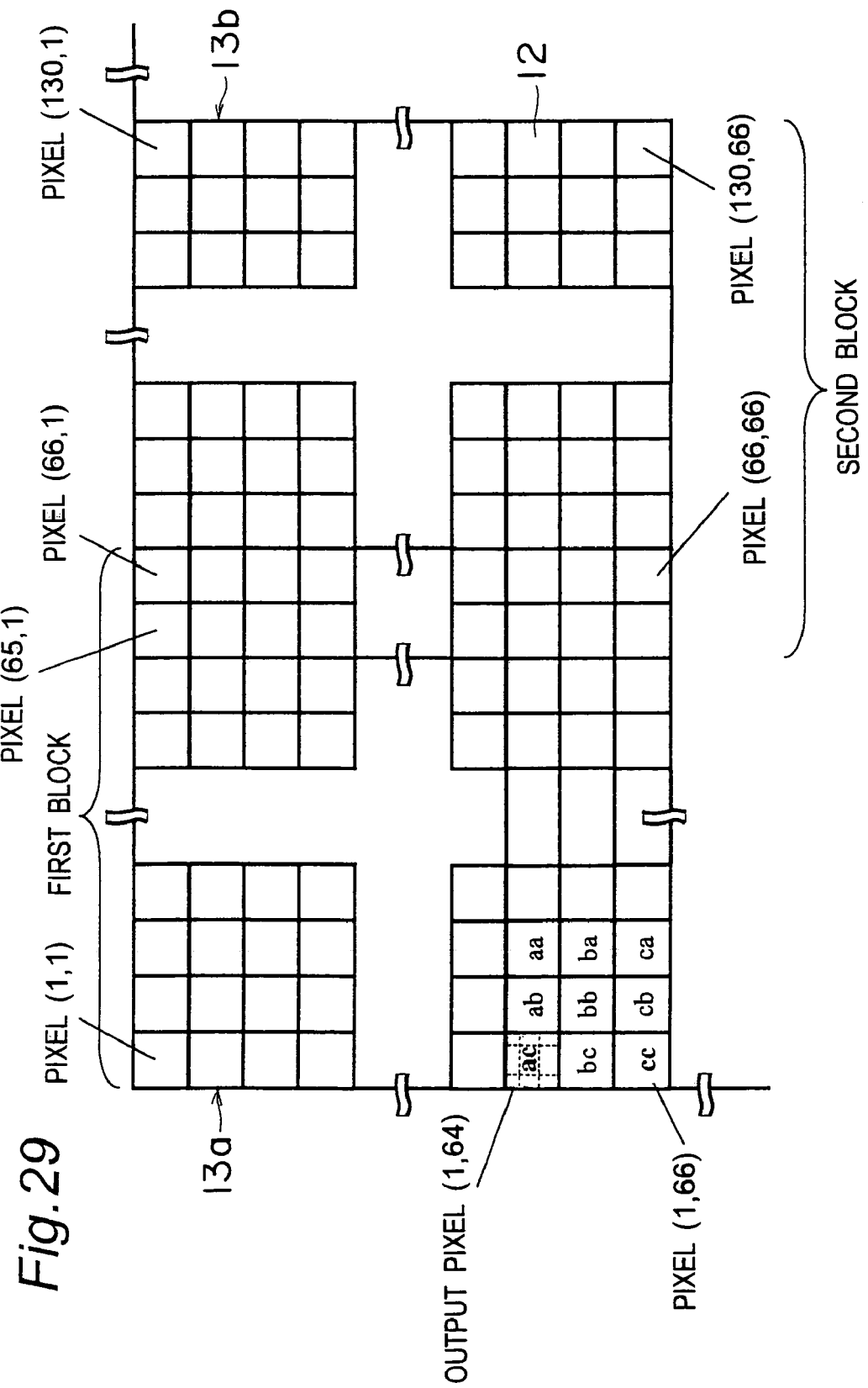
FIG. 29 is a schematic view showing pixel data stored in the third temporary storage section after the pixel data of pixels is transferred pixel by pixel, from the RAMs to the third temporary storage section at time t+3.

FIG. 29 shows the status of the pixel data stored in the third temporary storage section 23 immediately after the pixel data of the three pixels (3, 64) to (3, 66) is read from the RAMs 21a to 21c of the first temporary storage section 21 and written to the third temporary storage section 23 at step S12-4 of time t+3. After the pixel data in the third temporary storage section 23 has become the status shown in FIG. 27, the setting of the second selection section 27 is changed at step S12-5. Specifically, the setting of the second selection section 27 is changed so that the registers 23aa to 23ac are connected to the multiplier 31a, the registers 23ba to 23bc are connected to the multiplier 31b, and the registers 23ca to 23cc are connected to the multiplier 31c. Then, at step S12-6, the pixel data of the nine pixels stored in the third temporary storage section 23 is inputted to the arithmetic circuit 20, and the pixel data of the output pixel (1, 64) is generated. After the above-mentioned operation, the setting of the first selection section 26 is returned to the upper position.

Figure 30:
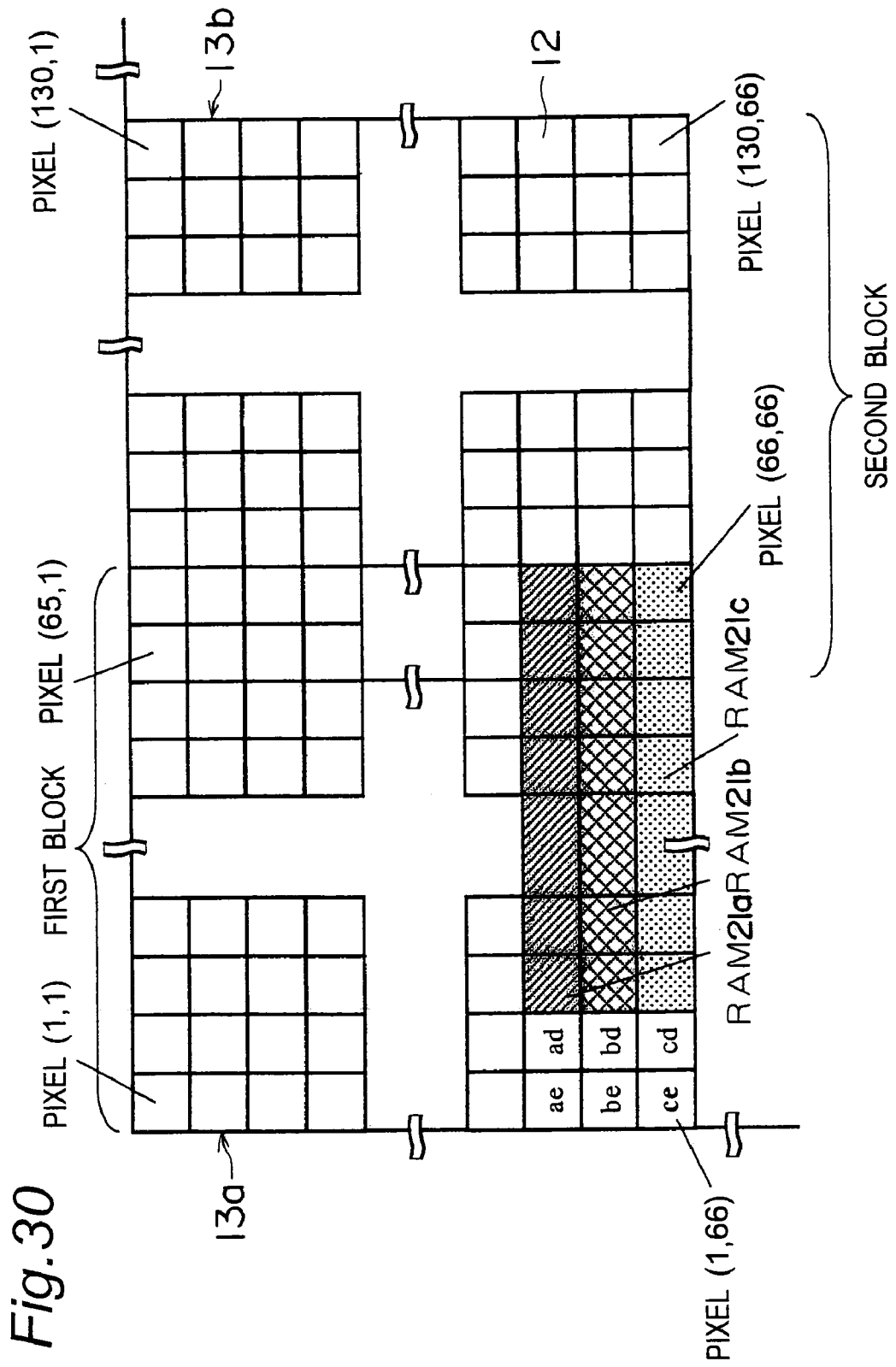
FIG. 30 is a schematic view showing pixel data stored in the first and second temporary storage sections immediately after time t+3.

FIG. 30 shows the status of the pixel data stored in the first temporary storage section 21 and the second temporary storage section 22 immediately after the pixel data of the pixel (1, 66) is generated at time t+3, that is, immediately before step S12-1 at time t+4. The pixel data of the pixels (3, 64) to (66, 64) is stored in the RAM 21a, the pixel data of the pixels (3, 65) to (66, 65) is stored in the RAM 21b, and the pixel data of the pixels (3, 66) to (66, 66) is stored in the RAM 21c. The pixel data of the six pixels (1, 64) to (2, 66) is stored in the second temporary storage section 22.

Figure 31:
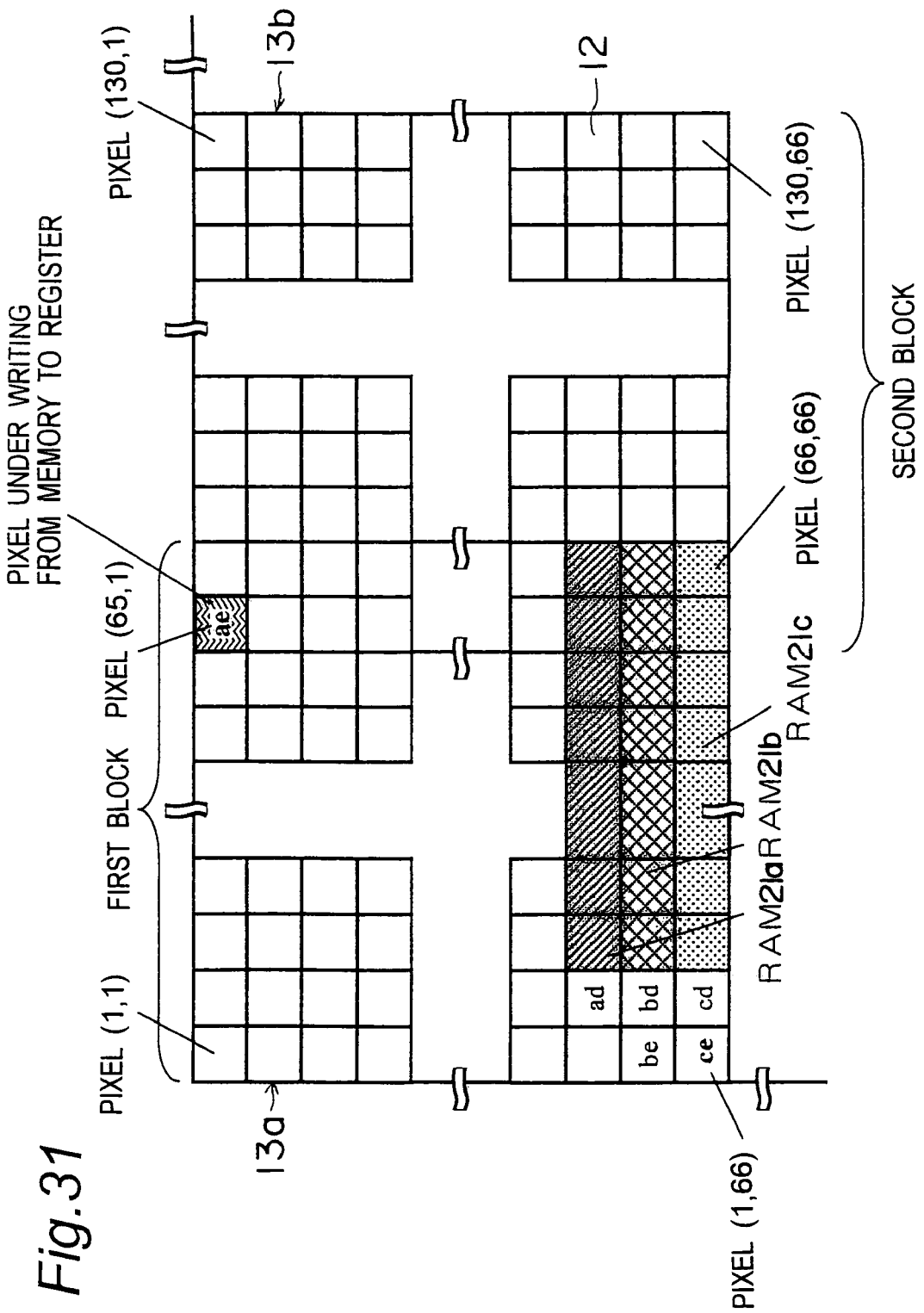
FIG. 31 is a schematic view showing pixel data stored in the first and second temporary storage sections after pixel data is read from the memory to the RAMs at time t+4.

FIG. 31 shows the status of the pixel data stored in the first temporary storage section 21 and the second temporary storage section 22 immediately after step S12-1 at time t+4. At step S12-1, overwriting with the pixel data of the pixel (65, 1) read from the memory 3 is carried out for the register 22ae in which the pixel data of the pixel (1, 64) is stored. The speed, destination and direction of reading pixel data are determined according to FIGS. 13 and 14. First, with respect to the condition 1, the previous writing point in the RAM 21c under writing is an address in which the pixel data of the pixel (66, 66) is stored, and the previous reading point is an address in which the pixel data of the pixel (3, 66) is stored. Therefore, the writing point is immediately before the reading point. Further, with respect to the condition 2, the pixel data of the pixels (65, 1) to (66, 3) required for generating the pixel data of the pixels in the next line (the first line) has not yet been stored in the second temporary storage section 22. Furthermore, with respect to the condition 3, the pixel (66, 66) read from the memory 3 and written to the RAM 21c is not a pixel in the first three lines of the image block 13. Therefore, the loading method B is selected, whereby the pixel data of the pixel (65, 1) is read from the memory 3 and written to the register 22ae.

Figure 32:
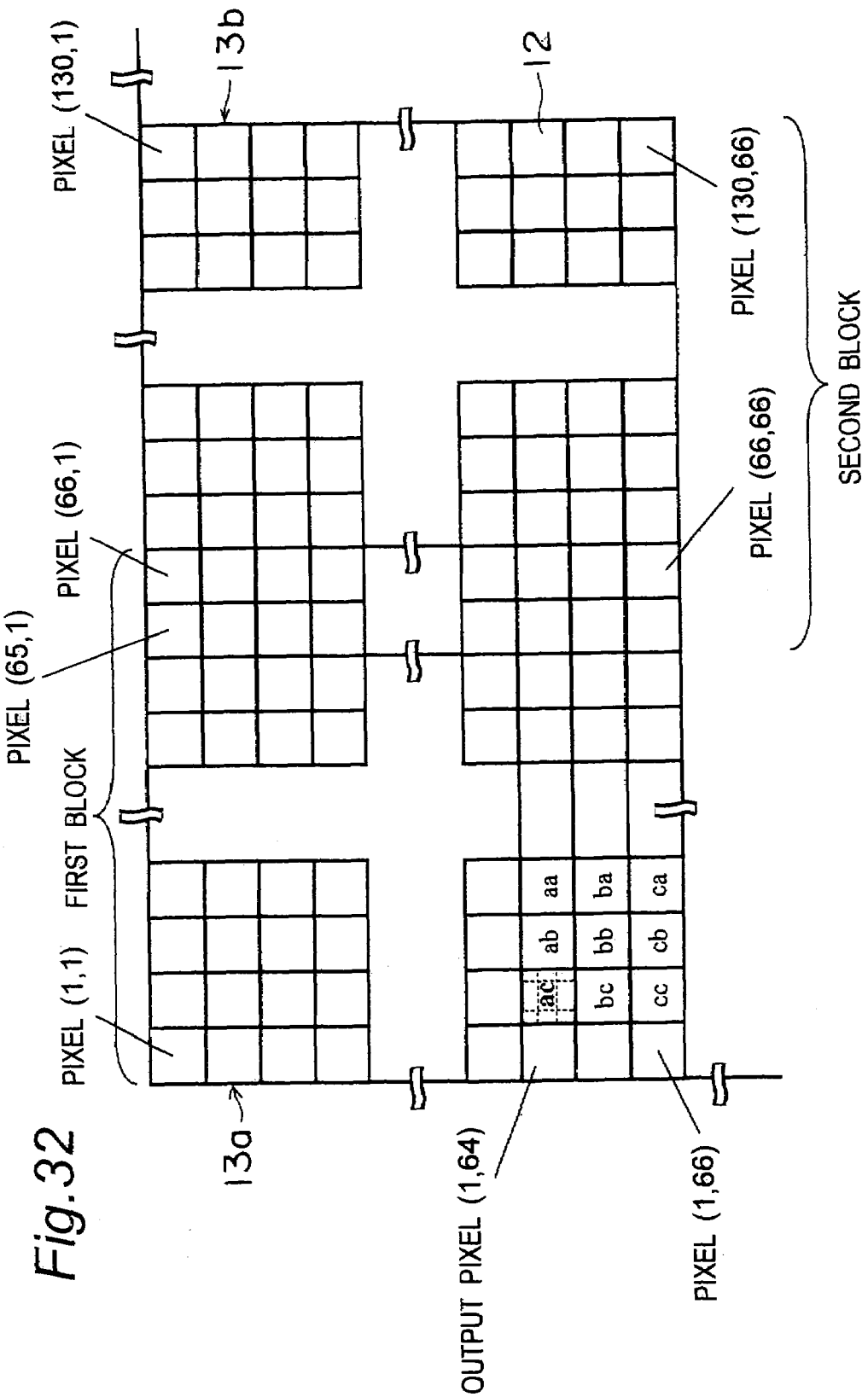
FIG. 32 is a schematic view showing pixel data stored in the third temporary storage section after an output pixel is generated at time t+4.

FIG. 32 shows the status of the pixel data stored in the third temporary storage section 23 immediately after the pixel data of the output pixel (2, 64) is generated at step S12-6 of time t+4. At step S12-2 of time t+4, it is judged that the output pixel (1, 64) generated previously does not correspond to the last pixel in a line of the image block 13. Further, at step S12-7, the pixel data in the third temporary storage section 23 is shifted, and at step S12-8, the pixel data of the pixels (4, 64) to (4, 66) is respectively loaded from the RAMs 21a to 21c to the third temporary storage section 23. Then, at step S12-6, the pixel data of the nine pixels stored in the third temporary storage section 23 is inputted to the arithmetic circuit 20, and the pixel data of the output pixel (2, 64) is generated.

Figure 33:
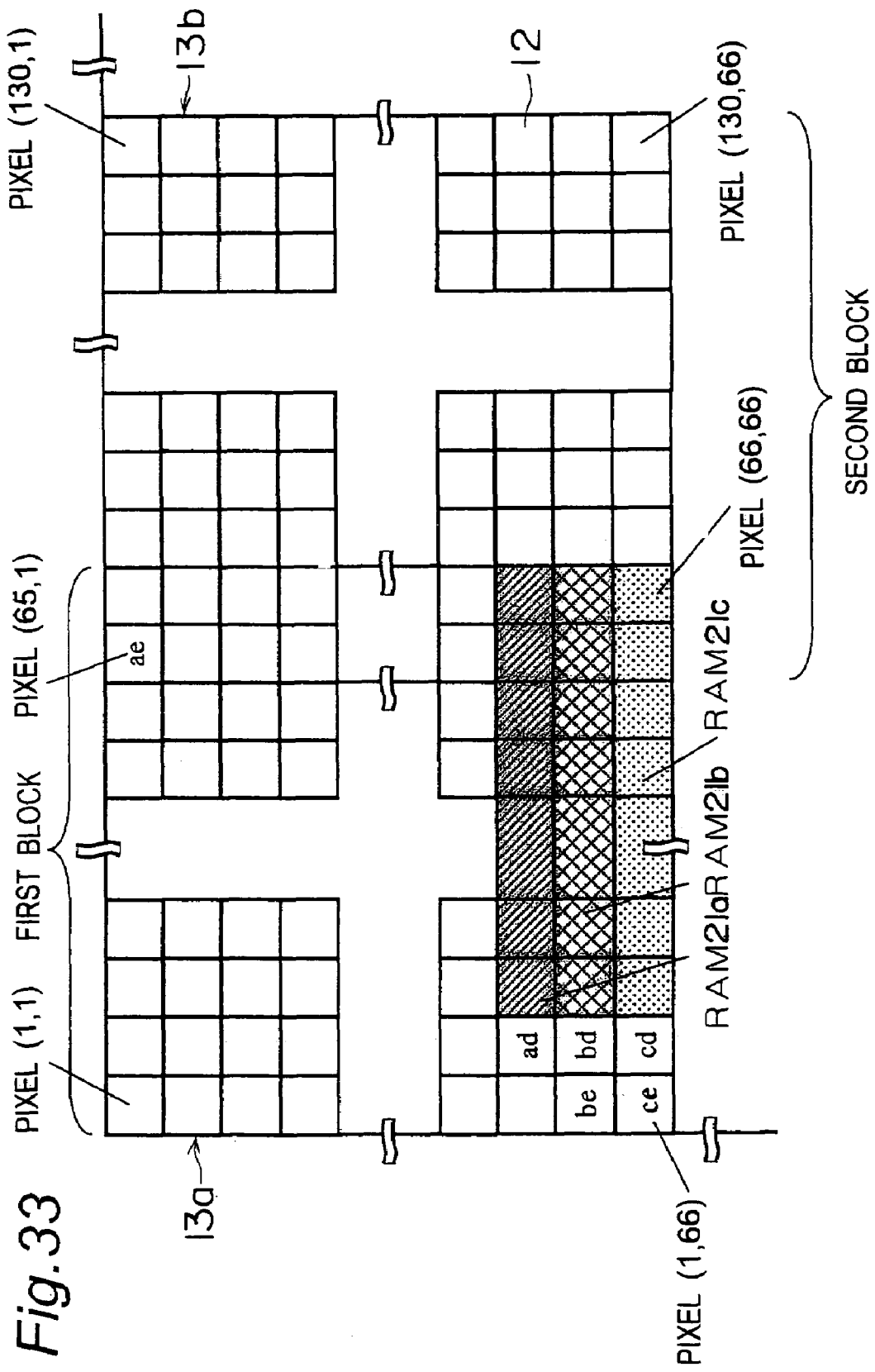
FIG. 33 is a schematic view showing pixel data stored in the first and second temporary storage sections immediately after time t+4.
Figure 34:
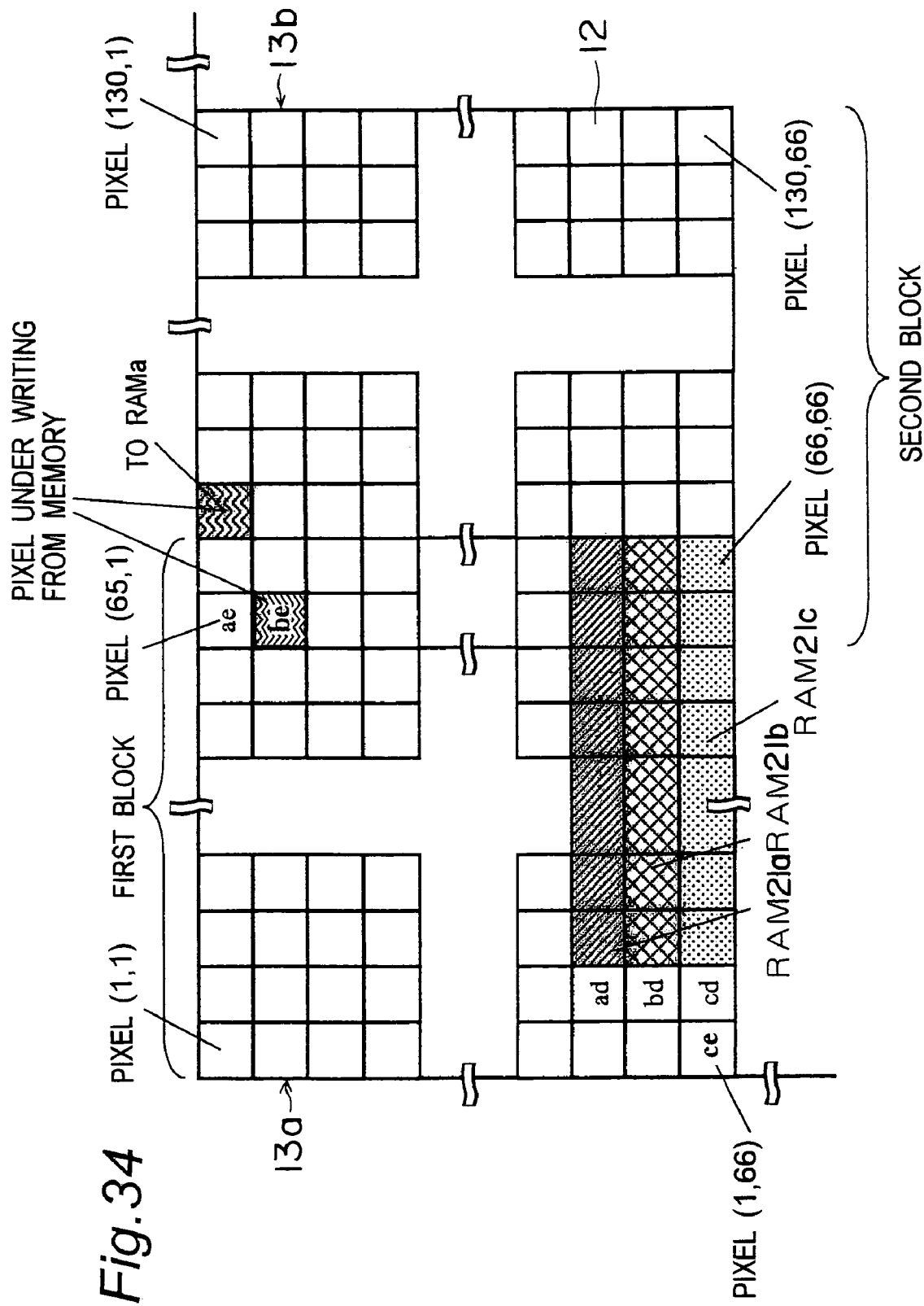
FIG. 34 is a schematic view showing pixel data stored in the first and second temporary storage sections after pixel data is read from the memory to the RAMs and registers at time t+5.

FIG. 33 shows the status of the pixel data stored in the first temporary storage section 21 and the second temporary storage section 22 immediately before step S12-1 of time t+5, and FIG. 34 shows the status of the pixel data stored in the first temporary storage section 21 and the second temporary storage section 22 immediately after step S12-1 of time t+5. The speed, destination and direction of reading pixel data from the memory 3 are determined according to FIGS. 13 and 14. With respect to the condition 1, the previous writing point in the RAM 21c under writing is an address in which the pixel data of the pixel (66, 66) is stored, and the previous reading point is an address in which the pixel data of the pixel (4, 66) is stored. Therefore, the writing point is not immediately before the reading point. Further, with respect to the condition 2, the pixel data of the pixels (65, 1) to (66, 3) required for generating the pixel data of the pixels in the next line (the first line) has not yet been stored in the second temporary storage section 22. Furthermore, with respect to the condition 3, the pixel (65, 1) read from the memory 3 and written to the register 22ae is a pixel in the first three lines of the image block 13. Therefore, the loading method H is selected, the pixel data of the pixel (65, 2) is read from the memory 3 and written to the register 22be, and the pixel data of the pixel (67, 1) is read from the memory 3 and written to the RAM 21a.

Figure 35:
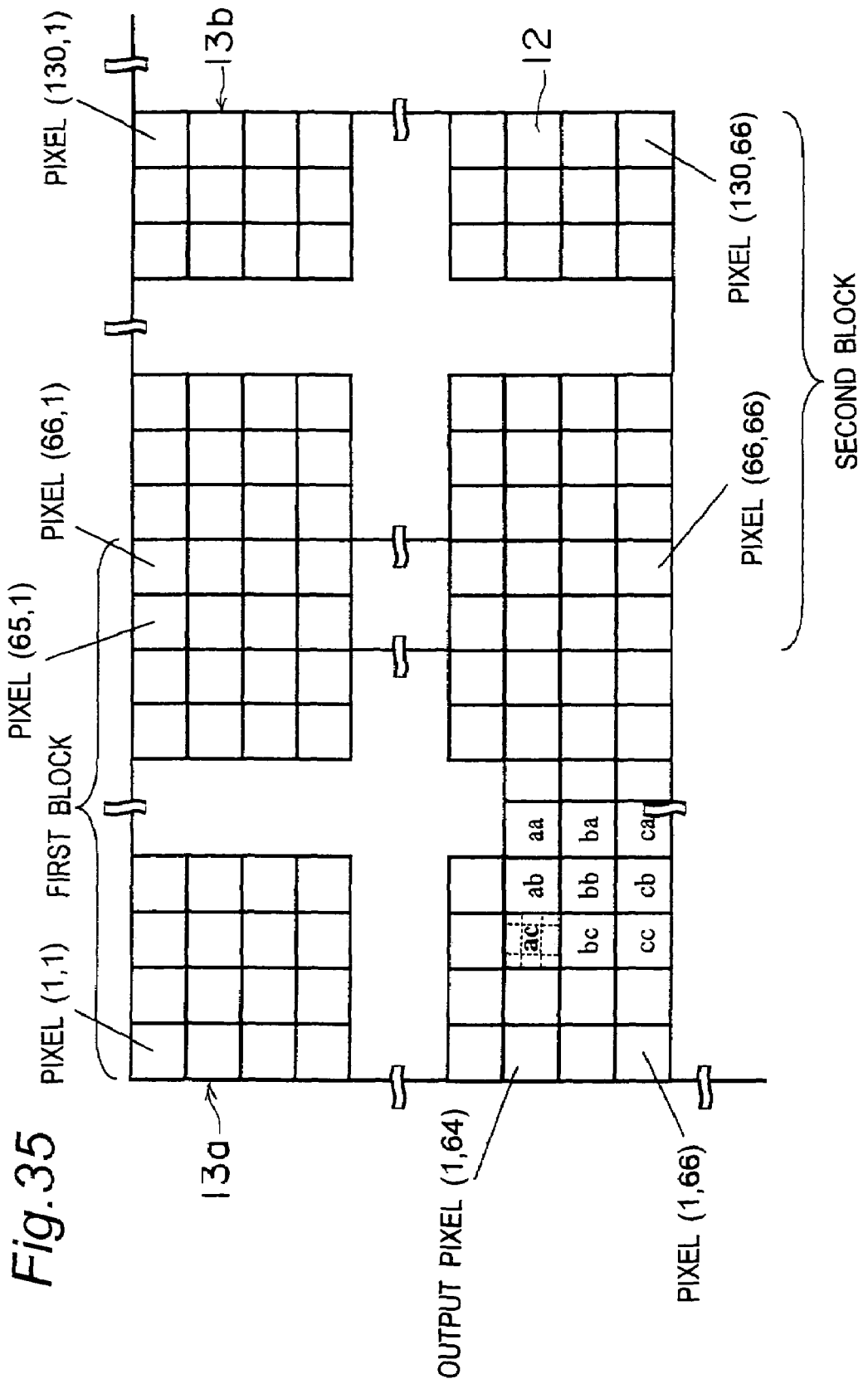
FIG. 35 is a schematic view showing pixel data stored in the third temporary storage section after the output pixel is generated at time t+5.

FIG. 35 shows the status of the pixel data stored in the third temporary storage section 23 immediately after the output pixel (3, 64) is generated at step S12-6 of time t+5. At step S12-2 of time t+5, it is judged that the pixel (2, 64) generated previously does not correspond to the last pixel in a line of the image block 13. Further, at step S12-7, the pixel data in the first temporary storage section 21 is shifted. At step S12-8, the pixel data of the pixels (5, 64) to (5, 66) is respectively read from the RAMs 21a to 21c and written to the third temporary storage section 23. Then, at step S12-6, the pixel data of the nine pixels stored in the third temporary storage section 23 is inputted to the arithmetic circuit 20, and the output pixel (3, 64) is generated.

Figure 36:
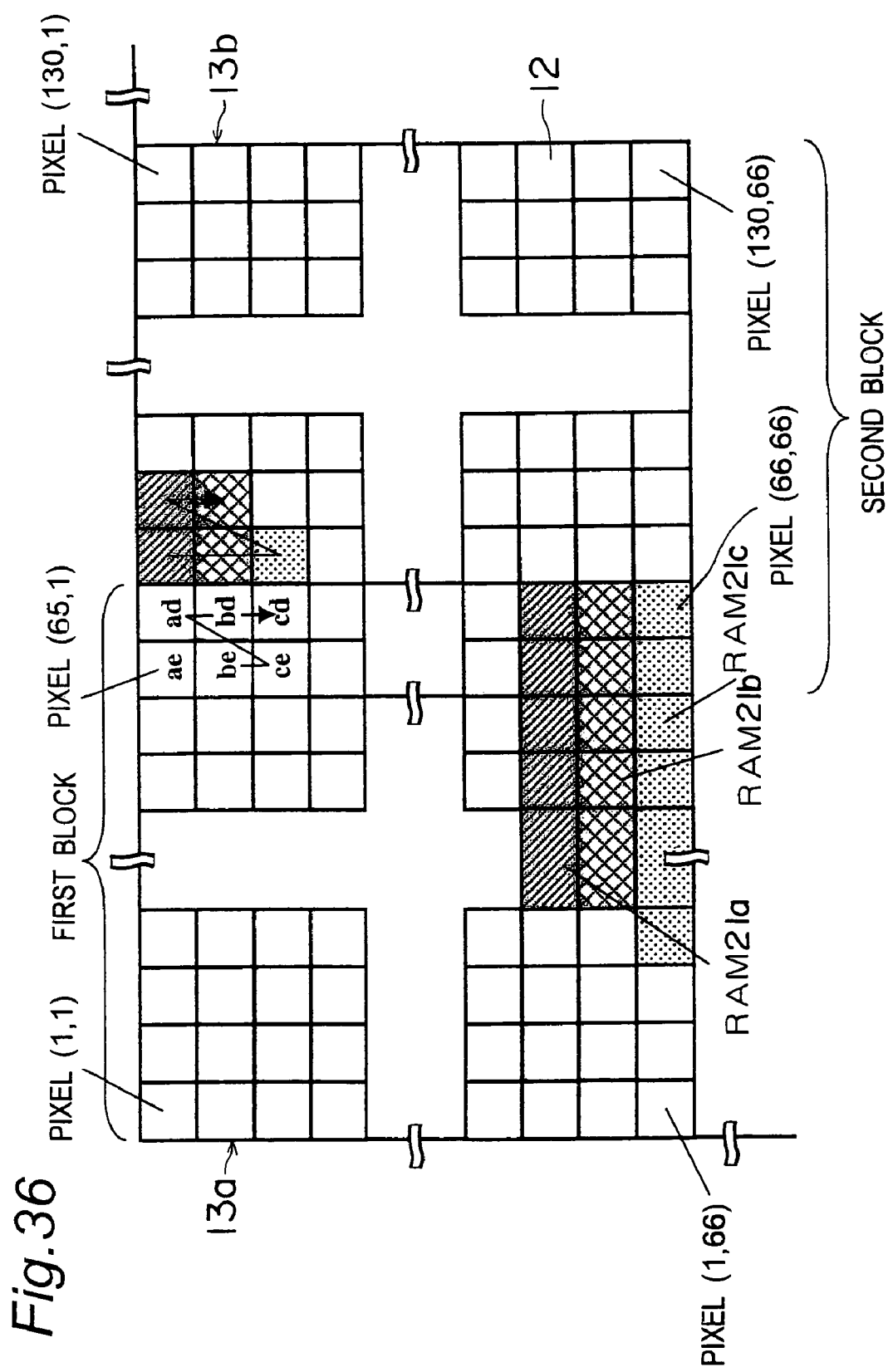
FIG. 36 is a schematic view showing pixel data stored in the first and second temporary storage sections immediately after time t+9.

At times t+6 to t+9, as in the case of time t+5, the pixel data read from the memory 3 is written to the first and second temporary storage sections 21 and 22 in the vertical direction (as indicated by the arrow "C" in FIG. 10). Further, at time t+6 to t+9, four output pixels (4, 67) to (7, 64) are generated. As shown in FIG. 36, immediately before step S12-1 at time t+10, the pixel data of the six pixels (65, 1) to (66, 3) has been stored in the second temporary storage section 22. Furthermore, the pixel data of the pixels (67, 1) and (68, 1) is stored in the RAM 21a, the pixel data of the pixels (67, 2) and (68, 2) is stored in the RAM 21b, and the pixel data of the pixel (67, 3) is stored in the RAM 21c.

Figure 37:
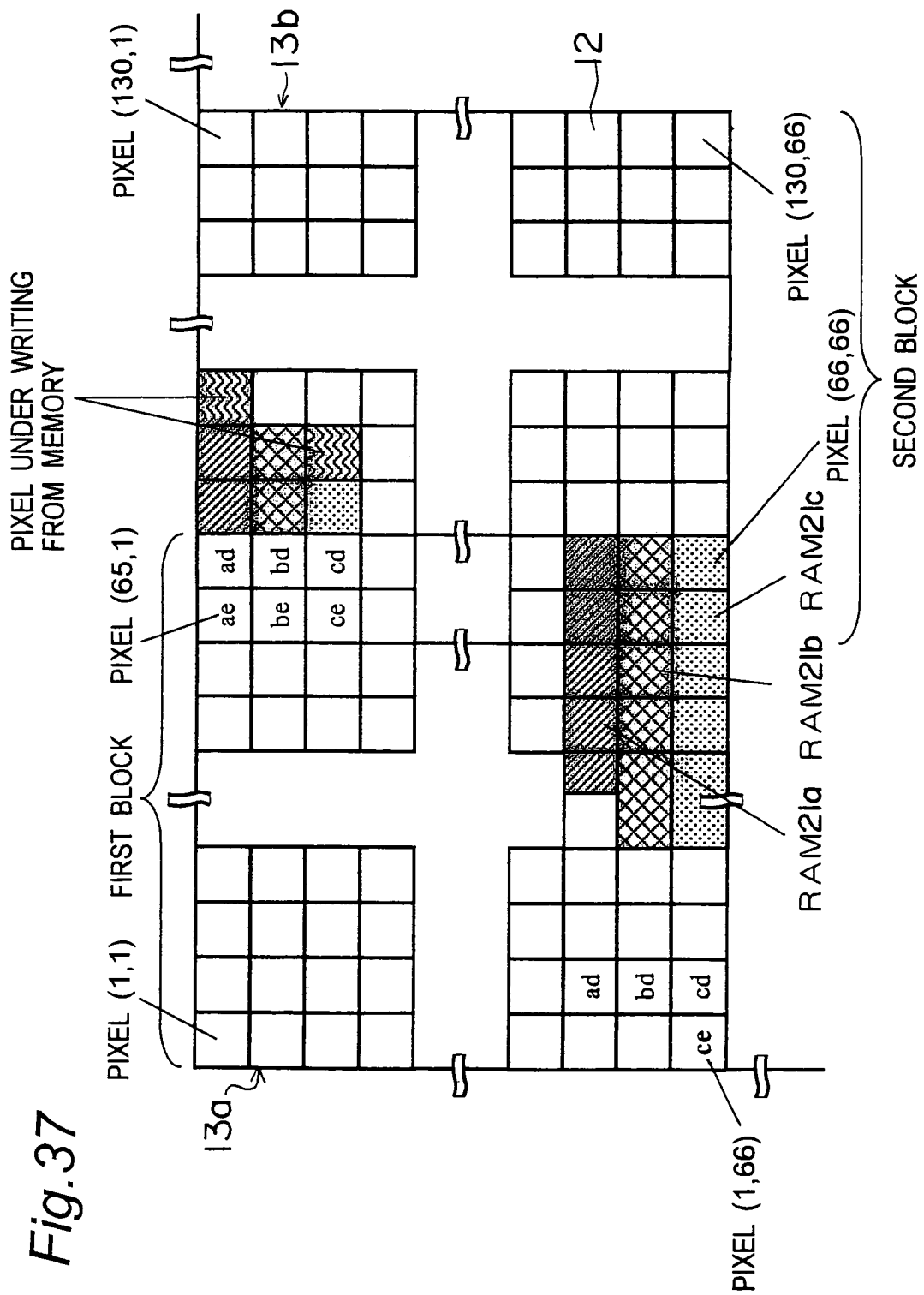
FIG. 37 is a schematic view showing pixel data stored in the first and second temporary storage sections after pixel data is read from the memory to the RAMs and registers at time t+10.
Figure 38:
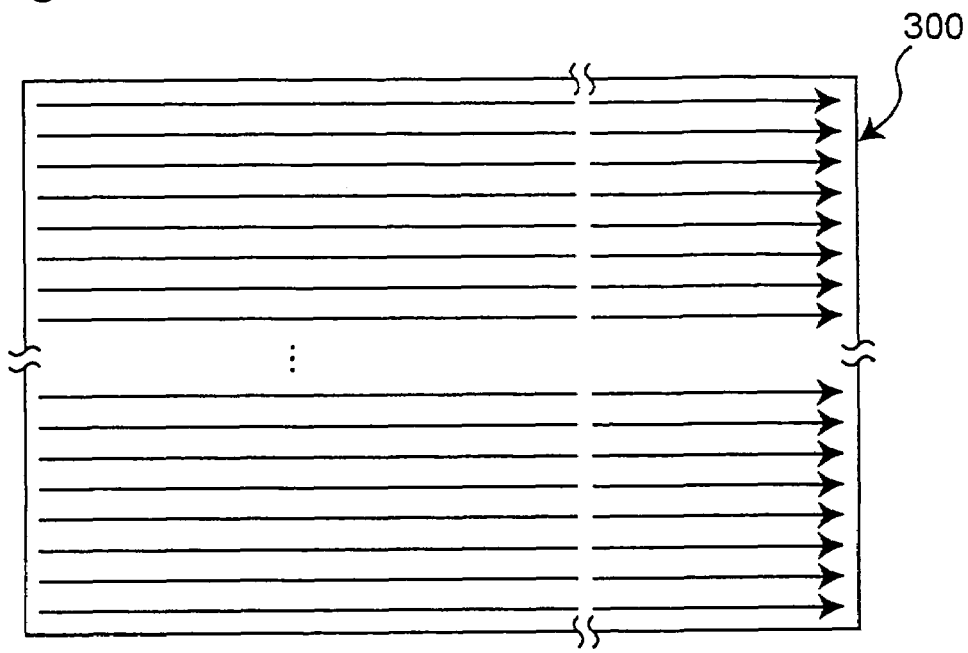
FIG. 38 is a schematic view showing the sequence of writing the pixel data of pixels in one frame.
Figure 39:
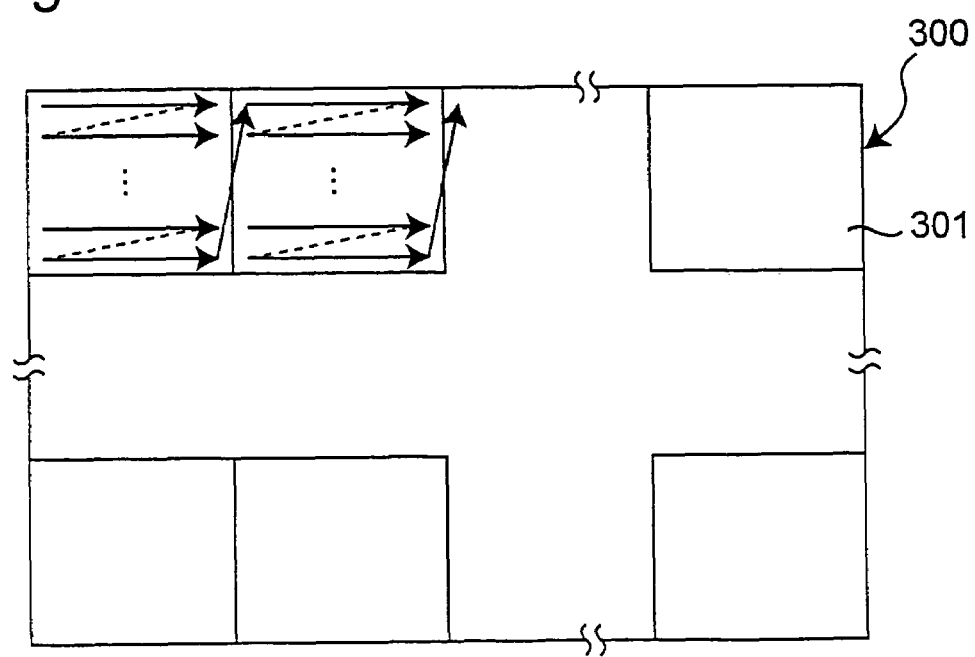
FIG. 39 is a schematic view showing the sequence of writing the pixel data of each image block.
Figure 40:
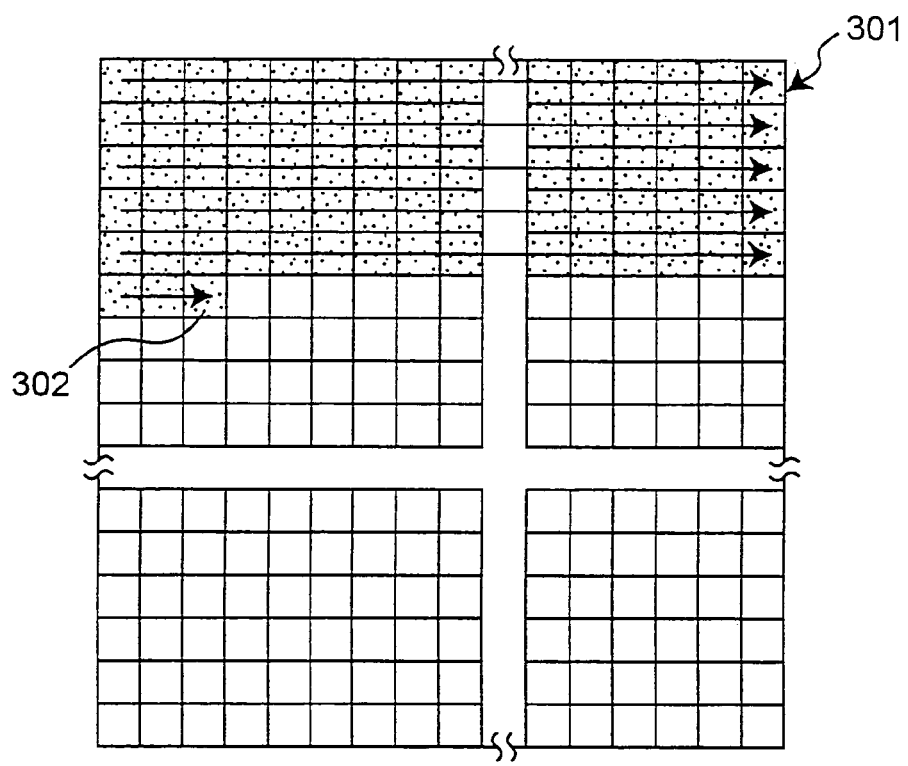
FIG. 40 is a schematic view illustrating loss during line processing.
Figure 41:
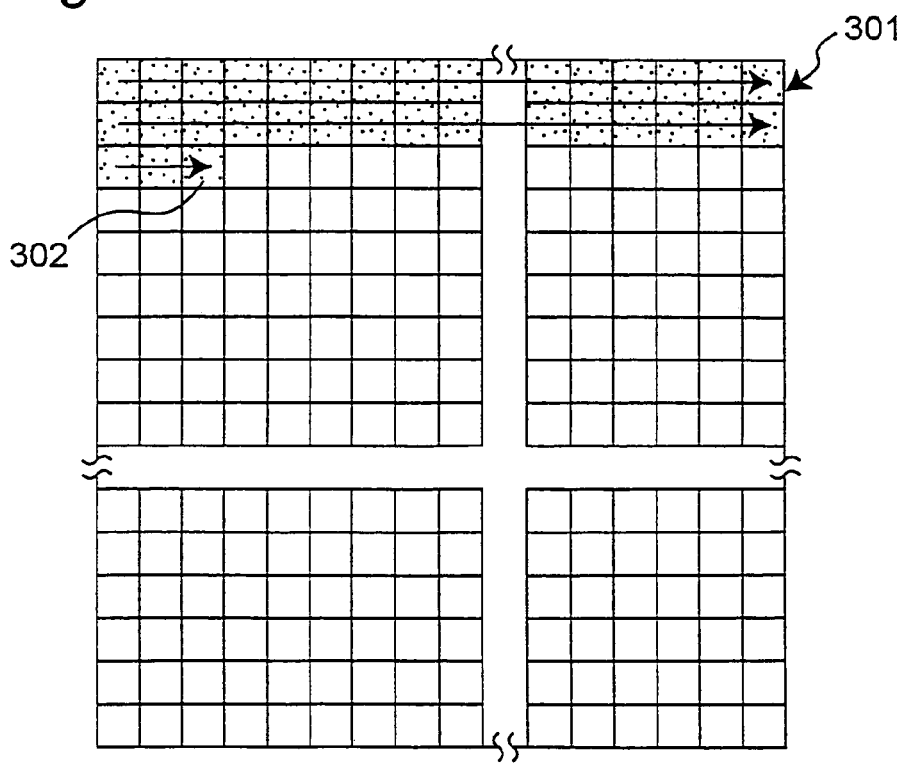
FIG. 41 is a schematic view illustrating loss at the image block processing.

At step S12-1 of time t+10, the loading method G is selected according to FIGS. 13 and 14, and the pixels (68, 3) and (69, 1) read from the memory 3 are stored in the RAM 21a as shown in FIG. 37. Since the pixel (7, 64) generated previously is not the last pixel in a line at S12-2, the data in the first temporary storage section 21 is shifted at step S12-7. At step S12-8, the pixel data of the pixels (10, 64) to (10, 66) is respectively read from the RAMs 21a to 21c and stored in the registers 23aa, 23ba and 23ca. In the end, at step S12-6, the arithmetic circuit 20 generates the output pixel (10, 64) on the basis of the pixel data of the nine pixels (8, 64) to (10, 66) stored in the third temporary storage section 23.

In the above-mentioned embodiment, the present invention is explained by taking an example wherein the pixel data of an output pixel is generated from the pixel data of nine adjacent pixels, that is, three adjacent pixels in the horizontal direction and three adjacent pixels in the vertical direction (see FIGS. 8A to 8C). In case that "M" is an integer of two or more, "N" is an integer of two or more, and the arithmetic circuit generates the output pixel from the pixel data of M pixels in the horizontal direction and N pixels in the vertical direction, the first temporary storage section needs to readably store the pixel data of only the Mth pixel to the last pixel in each line, and the second temporary storage section needs to readably store the pixel data of only the head pixel to the (M−1)th pixel in each line. In addition, in this case, with respect to the pixels belonging to the first to the Nth lines of one image block, the pixel data of the pixels should only be loaded from the memory to the first and second temporary storage sections in the vertical direction as indicated by the arrow "C" in FIG. 10.

The present invention is not limited to the above-mentioned embodiments, but can be modified variously. For example, the present invention can be applied to the resolution conversion circuit 6 in the image processing system 1 shown in FIG. 1. In addition, the present invention can also be applied to the image processing systems of apparatuses other than digital cameras, such as digital video cameras. Furthermore, the present invention can also be applied to a case wherein one frame of image is processed without being divided into image blocks.

Although explained completely referring to the accompanying drawings, the present invention can be changed and modified variously by those skilled in the art. Hence, it is understood that such changes and modifications are included in the present invention without departing from the spirit and scope of the present invention.

The invention claimed is:

1. An image processing apparatus comprising:
a random access memory image storage unit operable to store an image as a plurality of lines, each line having a plurality of pieces of pixel data sequentially arranged;
a first reading out unit operable to sequentially read out, from said random access memory image storage unit, the plurality of pieces of pixel data of each line of the plurality of lines and operable to sequentially output the plurality of pieces of pixel data sequentially read out;
a second reading out unit operable to read out one or more pieces of pixel data located at a head of each line of the plurality of lines and operable to output the one or more pieces of pixel data read out; and
an arithmetic unit operable to execute an arithmetic process for generating output pixel data using the pixel data output from said first reading out unit and said second reading out unit, wherein:
before said arithmetic unit completes the arithmetic process for generating a last output pixel data for one of the plurality of lines using the pixel data output from said first reading out unit, said second reading out unit is operable to read out the one or more pieces of the pixel data located at the head of a next line; and
said arithmetic unit is operable to use the pixel data output from said second reading out unit when executing the arithmetic process to generate a first output pixel data for the next line.

2. The image processing apparatus of claim 1, wherein said first reading out unit further comprises:
a line memory operable to store at least the plurality of pieces of the pixel data belonging to one line of the plurality of lines; and
a plurality of registers operable to store the sequentially arranged plurality of pieces of pixel data by sequential shifting.

3. A computer-readable recording medium having a program recorded thereon, the program causing a computer to execute a method comprising:
sequentially reading out a plurality of pieces of pixel data from each line of a plurality of lines from a random access memory image storage unit, using a first reading out unit and a second reading out unit, the random access memory image storage unit storing an image as the plurality of lines, each line having the plurality of pieces of pixel data sequentially arranged, and sequentially outputting the pieces of pixel data read out by said sequentially reading out; and
executing an arithmetic process using an arithmetic unit by generating output pixel data using the pieces of pixel data output from said outputting of the pieces of pixel data, wherein:
before said executing of the arithmetic process generates a last output pixel data for one of the lines using the pixel data output from the first reading out unit, said sequentially reading out using the second reading out unit includes reading out one or more pieces of the pixel data located at a head of a next line; and
said executing of the arithmetic process includes generating a first output pixel data for the next line by using the arithmetic unit to generate the first output pixel data using the pixel data output from the second reading out unit.

4. The computer-readable recording medium of claim 3, wherein the method further comprises:
storing, in a line memory of the first reading out unit, at least the plurality of pieces of the pixel data belonging to one line of the plurality of lines; and
storing, in a plurality of registers of the first reading out unit, the sequentially arranged pieces of pixel data by sequential shifting.

* * * * *

UNITED STATES PATENT AND TRADEMARK OFFICE
CERTIFICATE OF CORRECTION

PATENT NO. : 7,573,513 B2  Page 1 of 1
APPLICATION NO. : 10/508776
DATED : August 11, 2009
INVENTOR(S) : Yoshimasa Okabe It is certified that error appears in the above-identified patent and that said Letters Patent is hereby corrected as shown below:

On the Cover Page

In Item (56) References Cited, under the "FOREIGN PATENT DOCUMENTS" heading

"EP 0 340 794" should read -- EP 0 350 794 --.

Signed and Sealed this

Fifth Day of January, 2010

David J. Kappos
*Director of the United States Patent and Trademark Office*